(12) United States Patent
Park et al.

(10) Patent No.: US 10,770,801 B2
(45) Date of Patent: Sep. 8, 2020

(54) ANTENNA STRUCTURE INCLUDING PARASITIC CONDUCTIVE PLATE

(71) Applicants: Samsung Electronics Co., Ltd., Suwon-si, Gyeonggi-do (KR); KOREA ADVANCED INSTITUTE OF SCIENCE AND TECHNOLOGY, Daejeon (KR)

(72) Inventors: Jaeseok Park, Suwon-si (KR); Yeeun Chi, Daejeon (KR); Seongook Park, Daejeon (KR); Sungbum Park, Suwon-si (KR); Seongjin Park, Daejeon (KR); Sanghyuk Wi, Suwon-si (KR); Youngho Ryu, Suwon-si (KR); Taewan Kim, Daejeon (KR)

(73) Assignees: Samsung Electronics Co., Ltd., Suwon-si (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 27 days.

(21) Appl. No.: 16/251,763

(22) Filed: Jan. 18, 2019

(65) Prior Publication Data
US 2019/0237879 A1 Aug. 1, 2019

(30) Foreign Application Priority Data
Jan. 29, 2018 (KR) .......................... 10-2018-0010654

(51) Int. Cl.
| | | |
|---|---|---|
| H01Q 1/38 | (2006.01) | |
| H01Q 5/00 | (2015.01) | |
| H01Q 9/04 | (2006.01) | |
| H01Q 19/00 | (2006.01) | |
| H02J 50/20 | (2016.01) | |
| H01Q 1/24 | (2006.01) | |

(52) U.S. Cl.
CPC ........... *H01Q 19/005* (2013.01); *H01Q 1/243* (2013.01); *H01Q 1/38* (2013.01); *H02J 50/20* (2016.02)

(58) Field of Classification Search
USPC ........................................... 343/700 MS, 824
See application file for complete search history.

(56) References Cited

U.S. PATENT DOCUMENTS

| | | | |
|---|---|---|---|
| 6,211,824 B1* | 4/2001 | Holden ................. | H01Q 1/523 343/700 MS |
| 2013/0169503 A1 | 7/2013 | Fakharzadeh Jahromi | |
| 2015/0236425 A1* | 8/2015 | Sudo .................... | H01Q 9/0407 343/700 MS |
| 2016/0365632 A1 | 12/2016 | Lee | |
| 2020/0106183 A1* | 4/2020 | Fabrega Sanchez .. | H01Q 5/378 |

\* cited by examiner

*Primary Examiner* — Anh Q Tran
(74) *Attorney, Agent, or Firm* — Jefferson IP Law, LLP

(57) ABSTRACT

An antenna structure is provided. The antenna structure includes at least one feeder, a plurality of dielectric substrates, a plurality of conductive plates disposed between the plurality of dielectric substrates, the plurality of conductive plates including at least one opening, and a radiator electrically connected to the at least one feeder through conductive vias in the plurality of dielectric substrates and the plurality of conductive plates. The radiator includes a plurality of first parasitic conductive plates spaced apart from each other, and a second parasitic conductive plate disposed between the plurality of first parasitic conductive plates, the second parasitic conductive plate being spaced apart from the plurality of first parasitic conductive plates.

20 Claims, 12 Drawing Sheets

ANTENNA STRUCTURE INCLUDING PARASITIC CONDUCTIVE PLATE

CROSS-REFERENCE TO RELATED APPLICATION(S)

This application is based on and claims priority under 35 U.S.C. § 119(a) of a Korean patent application number 10-2018-0010654, filed on Jan. 29, 2018, in the Korean Intellectual Property Office, the disclosure of which is incorporated by reference herein in its entirety.

JOINT RESEARCH AGREEMENT

The disclosure was made by or on behalf of the below listed parties to a joint research agreement. The joint research agreement was in effect on or before the date the disclosure was made and the disclosure was made as a result of activities undertaken within the scope of the joint research agreement. The parties to the joint research agreement are 1) Samsung Electronics Co., Ltd. and 2) Korea Advanced Institute of Science and Technology.

BACKGROUND

1. Field

The disclosure relates to an antenna structure. More particularly, the disclosure relates to an antenna structure including a parasitic conductive plate.

2. Description of Related Art

Electronic devices may mean devices that perform specific functions according to programs incorporated therein. Such devices include electronic schedulers, portable multimedia reproducers, mobile communication terminals, tablet PCs, image/sound devices, desktop PCs, laptop PCs, or vehicular navigation systems, as well as home appliances. The above-mentioned electronic devices may output, for example, information stored therein as sounds or images. As the integration degree of such electronic devices has increased and super-high speed and large capacity wireless communication has become popular, various functions have recently been provided in a single electronic device, such as a mobile communication terminal. For example, various functions, such as entertainment functions (e.g., a game function), multimedia functions (e.g., a music/video reproducing function), communication and security functions for mobile banking, schedule management functions, and e-wallet functions, are integrated in a single electronic device, in addition to communication functions.

In communication devices mounted in electronic devices, efforts are underway to develop a next generation communication system such as a next generation ($5^{th}$-generation) communication system or a pre-next generation communication system in order to meet the growing demand for wireless data traffic, which has been an increasing trend since the commercialization of 4G ($4^{th}$-generation) communication system.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method of transmitting electric energy using an electromagnetic induction principle or a method of transmitting electric energy by radiating electromagnetic waves. Existing electromagnetic induction technology has a maximum chargeable distance of only 30 cm and requires a separate case or mat. In order to solve this problem, remote wireless power transmission technology is required. In addition, as user demand for high quality multimedia service rapidly increases, expanding and converging low power technology, integration technology, and the like in the remote wireless power transmission technology is required.

Wireless power transmission technology using a high-efficiency antenna may adversely affect the user's body due to the linearity of the antenna.

Another aspect of the disclosure is to provide an antenna structure capable of improving remote wireless power transmission and reducing influence on the human body using a cavity and a parasitic conductive plate.

Additional aspects will be set forth in part in the description which follows and, in part, will be apparent from the description, or may be learned by practice of the presented embodiments.

In accordance with an aspect of the disclosure, an antenna structure is provided. The antenna structure includes at least one feeding unit, a plurality of dielectric substrates, a plurality of conductive plates disposed between the plurality of dielectric substrates and including at least one opening, and a radiator electrically connected to the feeding unit through conductive vias in the dielectric substrates or the conductive plates. The radiator may include a plurality of first parasitic conductive plates spaced apart from each other, and a second parasitic conductive plate disposed between the plurality of first parasitic conductive plates and spaced apart from the first parasitic conductive plates.

In accordance with another aspect of the disclosure, an antenna structure is provided. The antenna structure includes at least one feeding unit, a first layer connected to the at least one feeding unit and including a first conductive plate, a second layer disposed on a front face of the first layer and including a second conductive plate, a third layer disposed on a front face of the second layer and including a third conductive plate, and a fourth layer disposed on a front face of the third layer and including a radiator electrically connected to the at least one feeding unit through conductive vias. The radiator may include a plurality of first parasitic conductive plates spaced apart from each other, and a second parasitic conductive plate disposed between the plurality of first parasitic conductive plates and spaced apart from the first parasitic conductive plates.

In accordance with another aspect of the disclosure, an electronic device is provided. The electronic device includes a housing, a printed circuit board disposed within the housing, a processor mounted on the printed circuit board, and an antenna structure disposed inside or outside the housing. The antenna structure may include a feeding unit, a dielectric substrate, an array of first parasitic conductive plates disposed on the dielectric plate to be spaced apart from each other, a second parasitic conductive plate disposed in a center of the array of the first parasitic conductive plates, first line conductors disposed to be in contact with the second parasitic plate, and second line conductors disposed perpendicular to the respective ones of the first line conductors and disposed in respective edges of the dielectric substrate.

In accordance with another aspect of the disclosure, an antenna structure is provided. The antenna structure includes a parasitic conductive plate that is capable of inducing a narrow band matching characteristic of the antenna and improving single resonant frequency gain using a cavity.

In accordance with another aspect of the disclosure, an antenna structure is provided. The antenna structure includes a parasitic conductive plate that is capable of ensuring high efficiency and reducing influence on the human body using a plurality of parasitic conductive plates to form a narrow beam in a predetermined direction.

In accordance with another aspect of the disclosure, an antenna structure is provided. The antenna structure includes a parasitic conductive plate that is capable of providing enhanced remote wireless power transmission using a cavity and the parasitic conductive plate.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
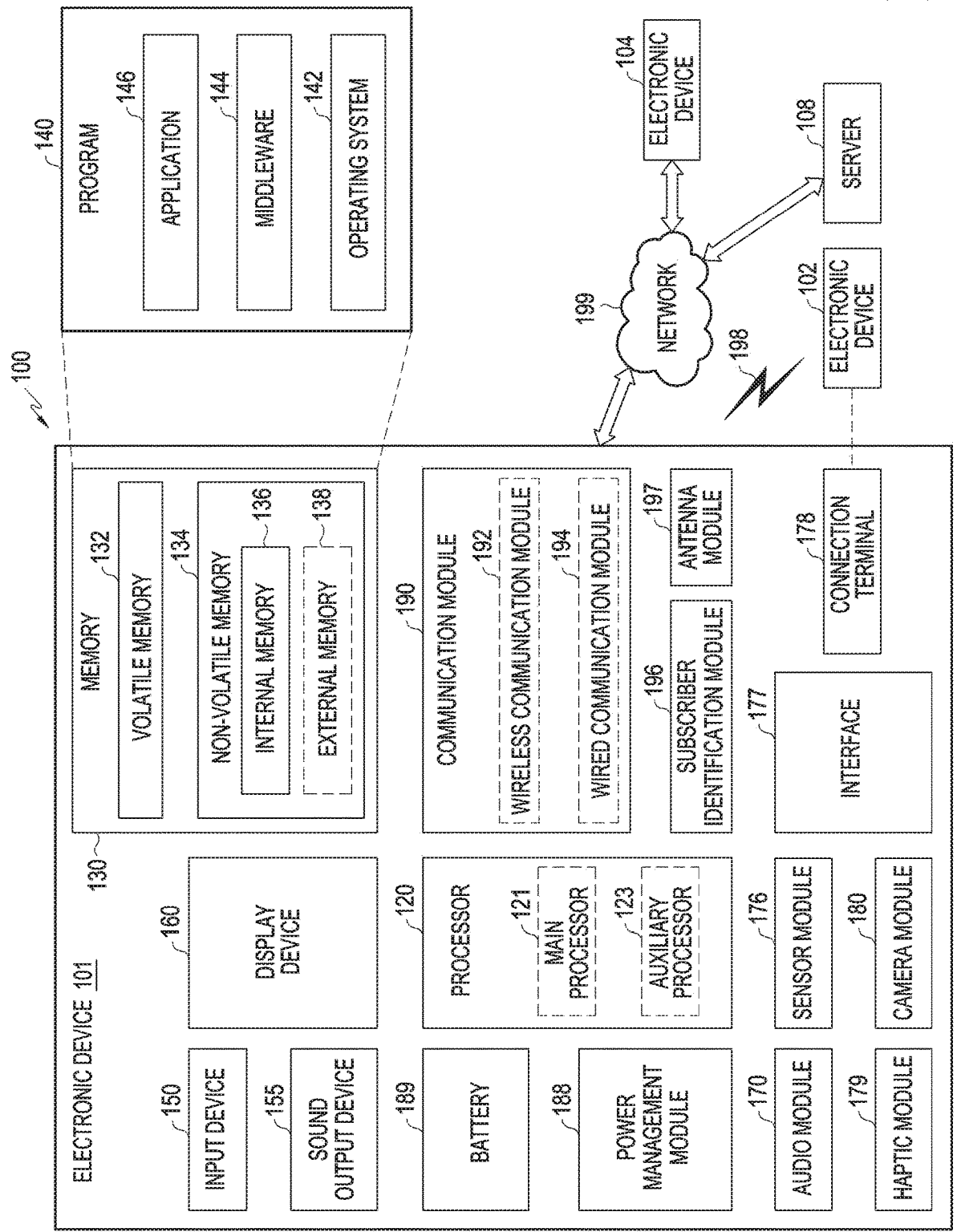
FIG. 1 is a block diagram illustrating an electronic device in a network environment, according to an embodiment of the disclosure.

FIG. 1 is a block diagram illustrating an electronic device in a network environment, according to an embodiment of the disclosure.

Referring to FIG. 1, an electronic device 101 in a network environment 100 may communicate with an external electronic device 102 via a first network 198 (e.g., a short-range wireless communication network), or may communicate with an external electronic device 104 or a server 108 via a second network 199 (e.g., a long-range wireless communication network). According to an embodiment, the electronic device 101 may communicate with the external electronic device 104 via the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, or an antenna module 197. In some embodiments, at least one of these components (e.g., the display device 160 or the camera module 180) may be eliminated from the electronic device 101 or other components may be added to the electronic device 101. In some embodiments, some of these components may be implemented as a single integrated circuit. For example, the sensor module 176 (e.g., a fingerprint sensor, an iris sensor, or an illuminance sensor) may be implemented in the state of being embedded in the display device 160 (e.g., a display).

The processor 120 may control at least one other component (e.g., a hardware or software component) of the electronic device 101, which is connected to the processor 120, and may perform various data processing or arithmetic operations by executing, for example, software (e.g., a program 140). According to an embodiment, as part of data processing or operation, the processor 120 may load instructions or data received from another component (e.g., the sensor module 176 or the communication module 190) in a volatile memory 132, and may process instructions or data stored in the volatile memory 132 so as to store the resulting data in a nonvolatile memory 134. According to an embodiment, the processor 120 may include a main processor 121 (e.g., a central processing unit or an application processor (AP)), and an auxiliary processor 123, which operates independently from or together with the main processor 121 (e.g., a graphic processing device, an image signal processor, a sensor hub processor, or a communication processor). Additionally or alternatively, the auxiliary processor 123 may use less power than the main processor 121, or may be set to be specific to a specified function. The auxiliary processor 123 may be implemented separately from, or as part of, the main processor 121.

The auxiliary processor 123 may control at least some functions or states associated with at least one of the components of the electronic device 101 (e.g., the display device 160, the sensor module 176, or the communication module 190), on behalf of the main processor 121, for example, while the main processor 121 is in an inactive (e.g., sleep) state, or together with the main processor 121 while the main processor 121 is in an active (e.g., application execution) state. According to an embodiment, the auxiliary processor 123 (e.g., an image signal processor or a communication processor) may be implemented as some of other functionally related components (e.g., the camera module 180 or the communication module 190).

The memory 130 may store various data to be used by at least one component of the electronic device 101 (e.g., the processor 120 or the sensor module 176). The data may include, for example, input data or output data for software (e.g., the program 140) and instructions associated therewith. The memory 130 may include, for example, the volatile memory 132 or the nonvolatile memory 134.

The program 140 may be stored in the memory 130 as software, and may include, for example, an operating system 142, middleware 144, or an application 146.

The input device 150 may receive instructions or data for use in a component (e.g., the processor 120) of the electronic device 101 from the outside (e.g., the user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes such as multimedia playback or record playback, and the receiver may be used for receiving incoming calls. According to an embodiment, the receiver may be implemented separately from, or as part of, the speaker.

The display device 160 may visually provide information to the outside (e.g., the user) of the electronic device 101. The display device 160 may include, for example, a display, a hologram device, or a projector and a control circuit configured to control the device. According to an embodiment, the display device 160 may include a touch circuit configured to sense a touch, or a sensor circuit (e.g., a pressure sensor) configured to measure the strength of a force generated by the touch.

The audio module 170 may convert sound into an electrical signal, or vice versa. According to an embodiment, the audio module 170 may acquire sound through the input device 150 or may output sound through the sound output device 155 or an external electronic device (e.g., the external electronic device 102 (e.g., a speaker or headphone)) directly or wirelessly connected with the electronic device 101.

The sensor module 176 may sense an operating state (e.g., power or temperature) of the electronic device 101 or an external environmental state (e.g., the user state), and may generate an electrical signal or a data value corresponding to the sensed state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an IR (infrared) sensor, a biometric sensor, a temperature sensor, a humidity sensor, or an illuminance sensor.

The interface 177 may support one or more designated protocols that may be used by the electronic device 101 so as to be directly or wirelessly connected to an external electronic device (e.g., the external electronic device 102). According to an embodiment, the interface 177 may include, for example, a high definition multimedia interface (HDMI), a universal serial bus (USB) interface, a secure digital (SD) card interface, or an audio interface.

A connection terminal 178 may include a connector through which the electronic device 101 may be physically connected to an external electronic device (e.g., the external electronic device 102). According to an embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., vibration or motion) or an electrical stimulus that may be perceived by the user through a tactile or kinesthetic sense. According to an embodiment, the haptic module 179 may include, for example, a motor, a piezoelectric element, or an electrical stimulation device.

The camera module 180 is a device that is capable of capturing, for example, a still image and a video image. According to an embodiment, the camera module 180 may include one or more lenses, image sensors, image signal processors, or flashes.

The power management module 188 may manage the power to be supplied to the electronic device 101. According to an embodiment, the power management module 388 may be implemented as at least a portion of, for example, a power management integrated circuit (PMIC).

The battery 189 is capable of supplying power to at least one component of the electronic device 101. According to an embodiment, the battery 189 may include, for example, a non-rechargeable primary battery, a rechargeable secondary battery, or a fuel cell.

The communication module 190 may establish a direct (e.g., wired) communication channel or a wireless communication channel between the electronic device 101 and an external electronic device (e.g., the external electronic device 102, the external electronic device 104, or the server 108), and may support communication via the established communication channel. The communication module 190 may include one or more communication processors, which are operated independently from the processor 120 (e.g., an AP) and support direct (e.g., wired) communication or wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication module). A corresponding one of these communication modules may communicate with an external electronic device via the first network 198 (e.g., a short-range communication network such as Bluetooth, Wi-Fi direct, or Infrared Data Association (IrDA) or the second network 199 (e.g., a cellular network, the Internet, or a computer network (e.g., a telecommunication network such as a LAN or wide area network (WAN)). These various types of communication modules may be integrated into one component (e.g., a single chip) or may be implemented as a plurality of components (e.g., a plurality of chips) that are separate from each other. The wireless communication module 192 may identify or authenticate the electronic device 101 in a communication network such as the first network 198 or the second network 199 using subscriber information (e.g., international mobile subscriber identity (IMSI)) stored in the subscriber identification module 196.

The antenna module 197 may transmit/receive signals or power to/from the outside (e.g., an external electronic device). According to an embodiment, the antenna module 197 may include one or more antennas, from which at least one antenna suitable for a communication scheme used in a communication network, such as the first network 198 or the second network 199, may be selected by, for example, the communication module 190. The signals or power may be transmitted or received between the communication module 190 and the external electronic device via the selected at least one antenna.

Among the components described above, at least some components may be connected to each other via a communication scheme (e.g., a bus, a general-purpose input and output (GPIO), a serial peripheral interface (SPI), or a mobile industry processor interface (MIPI)), and may exchange signals (e.g., commands or data) therebetween.

According to an embodiment, the commands or data may be transmitted or received between the electronic device 101 and the external electronic device 104 via the server 108 connected to the second network 199. Each of the external electronic devices 102 and 104 may be of a type, which is the same as or different from the electronic device 101. According to an embodiment, all or some of the operations executed on the electronic device 101 may be executed on one or more of the external electronic devices 102 and 104 and the server 108. For example, when the electronic device 101 is to perform a function or service automatically, or in response to a request from a user or other device, the electronic device 101 may request that one or more external electronic devices perform the function or at least part of the service, in place of or in addition to performing the function or service by itself. The one or more external electronic devices that receives the request may execute at least a portion of the requested function or service, or an additional function or service associated with the request, and may deliver the result of the execution to the electronic device 101. The electronic device 101 may process the result as it is or additionally so as to provide at least a portion of the response to the request. For this purpose, for example, cloud computing technology, distributed computing technology, or client-server computing technology may be used.

An electronic device according to various embodiments disclosed herein may be various types of devices. The electronic device may, for example, include at least one of a portable communication device (e.g., smartphone) a computer device, a portable multimedia device, a portable medical device, a camera, a wearable device, and a home appliance. The electronic device according to embodiments of the disclosure is not limited to the above-described devices.

The various embodiments and the terms used herein are not intended to limit the technical features disclosed herein to specific embodiments, and should be understood to include various modifications, equivalents, and/or alternatives to the corresponding embodiments. In describing the drawings, similar reference numerals may be used to designate similar or relevant constituent elements. The singular form of a noun corresponding to an item may include one or more of items, unless the context clearly indicates otherwise. Herein, each of phrases, such as "A or B", "at least one of A and B", "at least one of A or B", "A, B, or C", "at least one of A, B, and C", "at least one of A, B, or C" may include all possible combinations of items listed together in the corresponding phrase among the phrases. Terms such as "first" and "second" may simply be used to distinguish corresponding components from the other components, and the components are not limited in other respects (e.g., importance or order). When a certain (e.g., first) component is mentioned as being "coupled" or "connected" to another (e.g., second) component, with or without a term "functionally" or "communicatively", it means that the certain component can be connected directly (e.g., by wire), wirelessly, or via a third component to the another component.

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. For example, the module may be implemented in the form of an application-specific integrated circuit (ASIC).

Various embodiments disclosed herein may be implemented by software (e.g., the program 140) including one or more instructions stored in a storage medium (e.g., an internal memory 136 or an external memory 138) readable by a machine (e.g., the electronic device 101). For example, a processor (e.g., the processor 120) of a device (e.g., the electronic device 101) may call and execute at least one of the stored one or more instructions from a storage medium. This enables the device to be operated to perform at least one function in accordance with the at least one called instruction. The one or more instructions may include code generated by a compiler or code capable of being executed by an interpreter. The machine-readable storage medium may be provided in the form of a non-transitory storage medium. Here, the term "non-transient" merely means that the storage medium is a tangible device and does not contain a signal (e.g., electromagnetic waves), and this term is not intended to distinguish a case where data is permanently stored on the storage medium and a case where data is temporarily stored.

The method according to various embodiments disclosed herein may be included and provided in a computer program product. The computer program product may be traded as a product between a seller and a buyer. The computer program product may be distributed in the form of a machine-readable storage medium (e.g., compact disc read only memory (CD-ROM)), or may be distributed online via an application store (e.g., Play Store) or directly between two user devices (e.g., smartphones). If distributed online, at least part of the computer program product may be temporarily generated or at least temporarily stored in the machine-readable storage medium, such as memory of the manufacturer's server, a server of the application store, or a relay server.

According to various embodiments, each (e.g., a module or a program) of the above-described components may include one or more entities. According to various embodiments, one or more of the components or operations described above may be omitted, or one or more other components or operations may be added. Alternatively or additionally, a plurality of components (e.g., modules or programs) may be integrated into one component. In such a case, the integrated component may perform one or more functions of each of the plurality of components may be performed in the same or similar manner as being performed by the corresponding one of the plurality of components prior to the integration. According to various embodiments, operations performed by a module, a program, or other components may be performed sequentially, in parallel, repetitively, or heuristically, one or more of the operations may be performed in a different order or omitted, or one or more other operations may be added thereto. Hereinafter, an electronic device according to various embodiments will be described with reference to the accompanying drawings. Herein, the term "user" may refer to a person who uses an electronic device or a device that uses an electronic device (e.g., an artificial intelligence electronic device).

Figure 2:
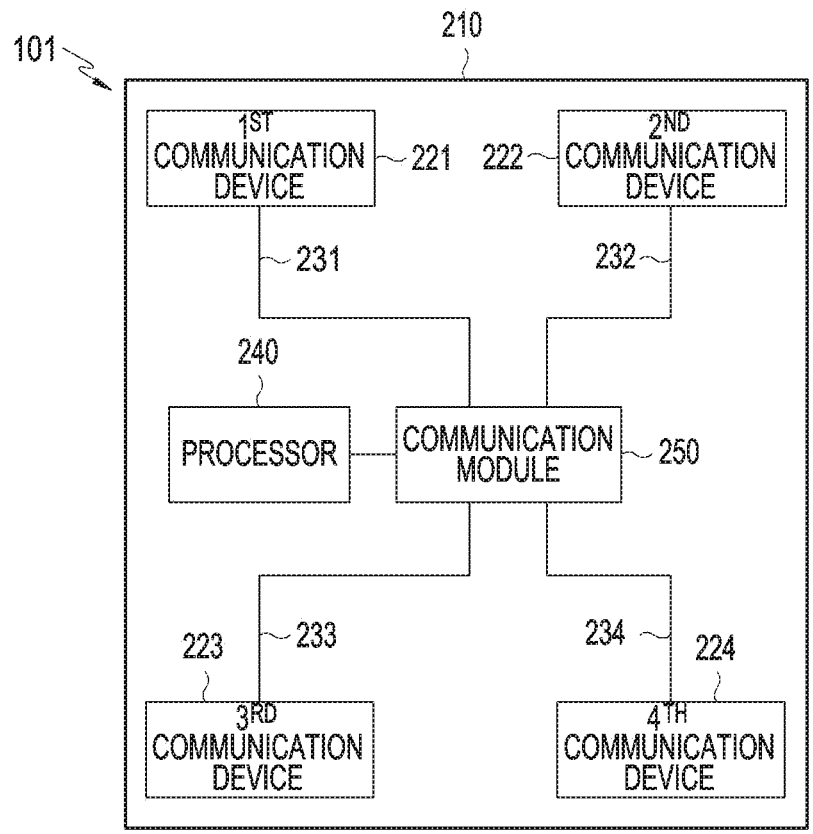
FIG. 2 is a view illustrating an example of an electronic device that supports wireless communication according to an embodiment of the disclosure.

FIG. 2 is a view illustrating an example of an electronic device that supports wireless communication according to an embodiment of the disclosure.

Referring to FIG. 2, the electronic device 101 includes a housing 210, a processor 240, a communication module 250 (e.g., the communication module 190 in FIG. 1), a first communication device 221, a second communication device 222, a third communication device 223, a fourth communication device 224, a first conductive line 231, a second conductive line 232, a third conductive line 233, or a fourth conductive line 234.

According to an embodiment, the housing 210 is capable of protecting the other components of the electronic device 101. The housing 210 may include, for example, a front plate, a rear plate facing away from the front plate, and a side member (or a metal frame) attached to or integrally formed with the rear plate and surrounding a space between the front plate and the rear plate.

According to an embodiment, the electronic device 101 may include at least one communication device. For example, the electronic device 101 may include at least one of the first communication device 221, the second communication device 222, the third communication device 223, and the fourth communication device 224.

According to an embodiment, the first communication device 221, the second communication device 222, the third communication device 223, or the fourth communication device 224 may be located within the housing 210. According to an embodiment, when viewed from above the rear plate of the electronic device, the first communication device 221 may be located at the upper-left end of the electronic device 101, the second communication device 222 may be located at the upper-right end of the electronic device 101, the third communication device 223 may be disposed at the lower-left end of the electronic device 101, and the fourth communication device 224 may be disposed at the lower-right end of the electronic device 101.

According to an embodiment, the processor 240 may include one or more of a central processing unit, an AP, a graphic processing unit (GPU), a camera image signal processor, or a baseband processor (or a communication processor (CP)). According to an embodiment, the processor 240 may be implemented as a system on chip (SoC) or a system in package (SiP).

According to an embodiment, the communication module 250 may be electrically connected to at least one communication device using at least one conductive line. For example, the communication module 250 be electrically connected to the first communication device 221, the second communication device 222, the third communication device 223, or the fourth communication device 224 using the first conductive line 231, the second conductive line 232, the third conductive line 233, or the fourth conductive line 234. The communication module 250 may include, for example, a baseband processor, or at least one communication circuit (e.g., an IFIC, or a radio frequency integrated circuit (RFIC)). The communication module 250 may include, for example, a baseband processor (e.g., an AP) separate from the processor 240. The first conductive line 231, the second conductive line 232, the third conductive line 233 or the fourth conductive line 234 may include, for example, a coaxial cable or an FPCB.

According to an embodiment, the communication module 250 may include a first baseband processor (BP) (not illustrated) or a second BP (not illustrated). The electronic device 101 may further include one or more interfaces for supporting chip-to-chip communication between the first BP (or the second BP) and the processor 240. The processor 240 and the first BP or the second BP may transmit and receive data using an inter-chip interface (inter-process communication channel).

According to an embodiment, the first BP or the second BP may provide an interface for performing communication with other entities. The first BP may support, for example, wireless communication for a first network (not illustrated). The second BP may support, for example, wireless communication for a second network (not illustrated).

According to an embodiment, the first BP or the second BP may form one module with the processor 240. According to an embodiment, the first BP or the second BP may be integrally formed with the processor 240. As another example, the first BP or the second BP may be disposed in one chip, or may be formed in the form of an independent chip. According to an embodiment, the processor 240 and at least one BP (e.g., the first BP) may be integrally formed in one chip (SoC chip), and the other BP (e.g., the second BP) may be formed in the form of an independent chip.

According to an embodiment, a first network (not illustrated) or a second network (not illustrated) may correspond to the second network 199 of FIG. 1. According to an embodiment, each of the first network (not illustrated) and the second network (not illustrated) may include a 4G ($4^{th}$ generation) network and a 5G ($5^{th}$ generation) network. The 4G network may support, for example, a LTE protocol defined in 3GPP. The 5G network may support, for example, a NR protocol defined in 3GPP.

Figure 3:
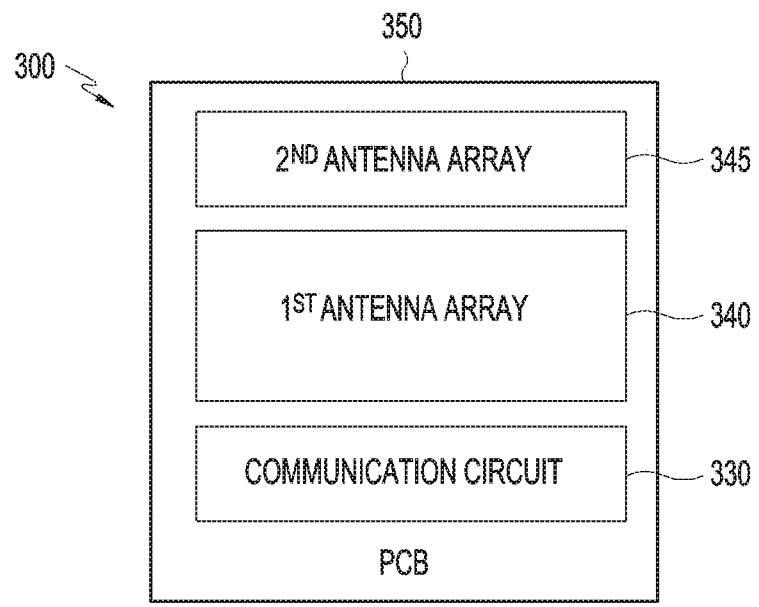
FIG. 3 is a block diagram of an electronic device according to an embodiment of the disclosure.

FIG. 3 is a block diagram of an electronic device according to an embodiment of the disclosure.

Referring to FIG. 3, a communication device 300 (e.g., the first communication device 221, the second communication device 222, the third communication device 223, or the fourth communication device 224 in FIG. 2) may include a communication circuit 330 (e.g., an RFIC), a printed circuit board (PCB) 350, a first antenna array 340, or a second antenna array 345.

According to an embodiment, the communication circuit 330, the first antenna array 340, or the second antenna array 345 may be disposed on the PCB 350. For example, the first antenna array 340 or the second antenna array 345 may be disposed on a first face of the PCB 350 and the communication circuit 330 may be disposed on the second face of the PCB 350. The PCB 350 may include a connector (e.g., a coaxial cable connector or a Board to Board (B-to-B) connector) to be electrically connected to another PCB (e.g., a PCB on which the communication module 250 of FIG. 2 is disposed) using a transmission line (e.g., the first conductive line 231 in FIG. 2 or a coaxial cable). The PCB 350 is coaxially connected to a PCB on which the communication module 250 is disposed using, for example, a coaxial cable connector, and the coaxial cable may be used for delivering a transmission and reception IF signal or RF signal. As another example, power or other control signals may be communicated through the B-to-B connector.

According to an embodiment, the first antenna array 340 or the second antenna array 345 may include a plurality of antennas. The antennas may include a patch antenna, a loop antenna, or a dipole antenna. For example, the plurality of antennas included in the first antenna array 340 may be patch antennas to form a beam toward the rear plate of the electronic device 200. As another example, the plurality of antennas included in the second antenna array 345 may be a dipole antenna or a loop antenna in order to form a beam toward the side member of the electronic device 200.

According to an embodiment, the communications circuit 330 may support at least some of the bands that are 6 GHZ or less. As another example, the communication circuit 330 may support at least a part of a band from 6 GHz to 300 GHz (e.g., from 24 GHz to 30 GHz or from 37 GHz to 40 GHz). According to an embodiment, the communication circuit 330 may upconvert or downconvert the frequency. For example, the communication circuit 330 included in the communication device 300 (e.g., the first communication device 221 in FIG. 2) may upconvert an IF signal received from a communication module (e.g., the communication module 250 in FIG. 2) via a conductive line (e.g., the first conductive line 231 in FIG. 2) into an RF signal. As another example, the communication circuit 330 included in the communication device 300 (e.g., the first communication device 221 in FIG. 2) may downconvert an RF signal (e.g., a millimeter wave signal) received via the first antenna array 340 or the second antenna array 345 into an IF signal, and may transmit the IF signal to the communication module using a conductive line.

Figure 4:
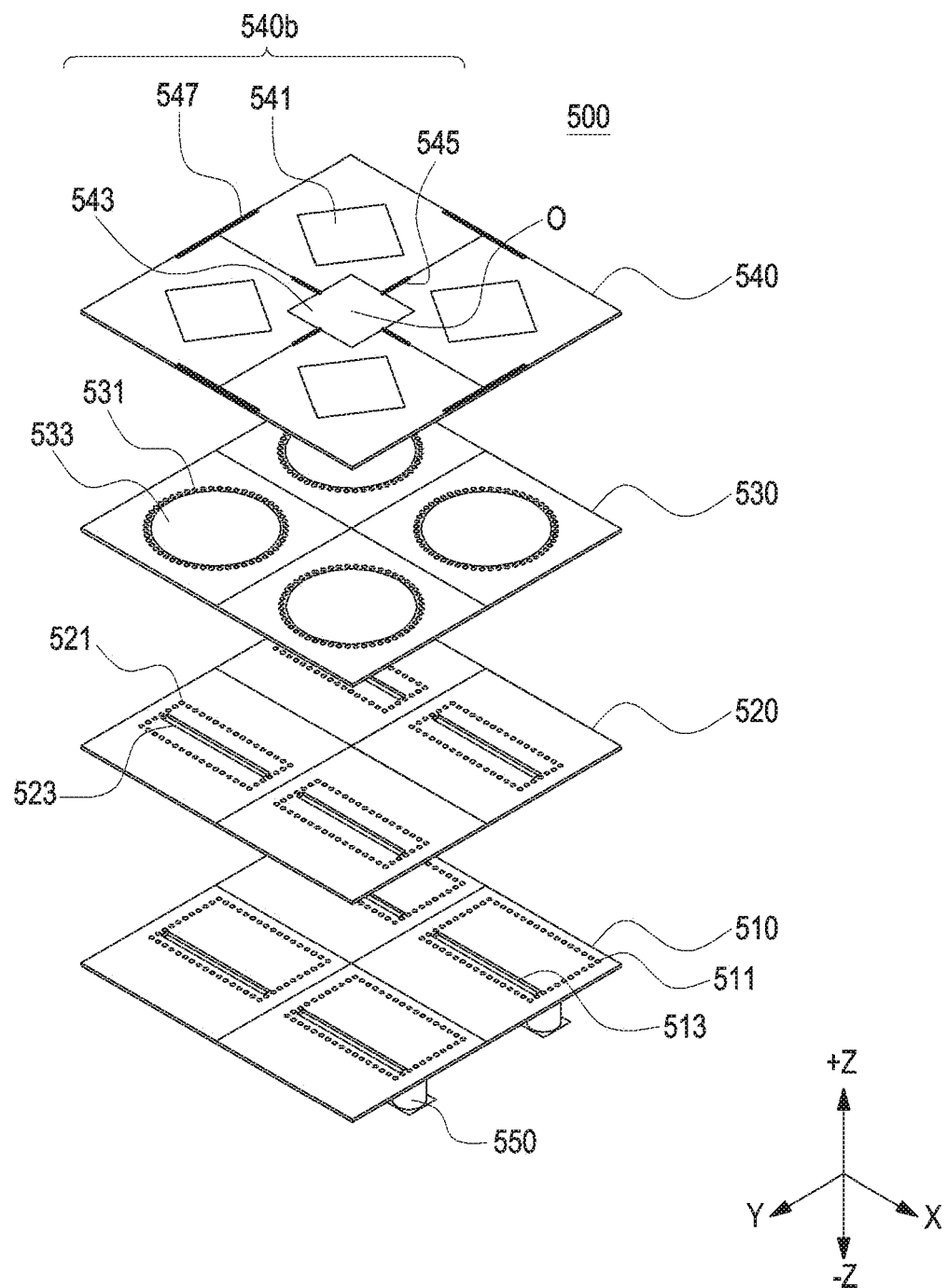
FIG. 4 is an exploded perspective view illustrating an antenna structure of a communication device according to an embodiment of the disclosure.

FIG. 4 is an exploded perspective view illustrating an antenna structure of a communication device according to an embodiment of the disclosure.

Figure 5:
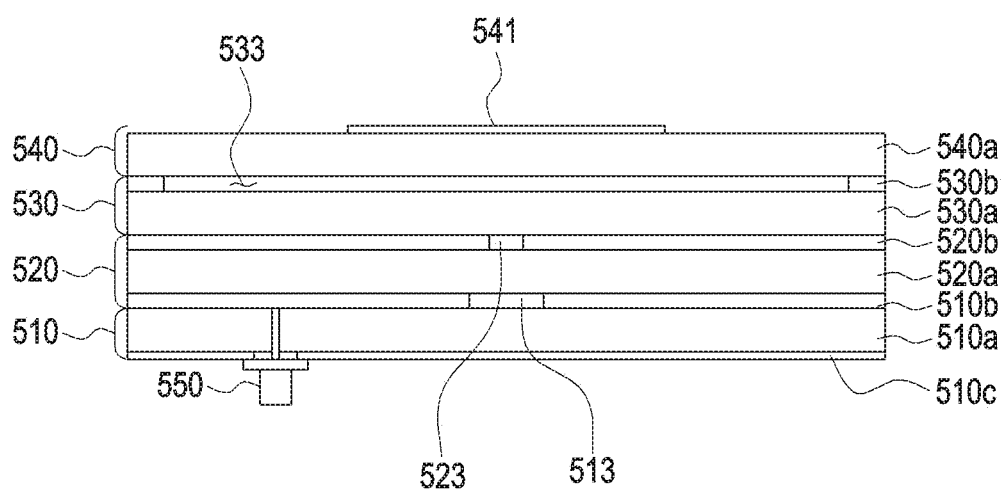
FIG. 5 is a cross-sectional view illustrating a stacking relationship of an antenna structure of a communication device according to an embodiment of the disclosure.

FIG. 5 is a cross-sectional view illustrating a stacking relationship of an antenna structure of a communication device according to an embodiment of the disclosure.

Referring to FIG. 4, "X" in an orthogonal coordinate system of three axes may indicate the longitudinal direction of an antenna structure 500, "Y" may indicate the width direction of the antenna structure 500, and "Z" may indicate the thickness direction of the antenna structure 500. In an embodiment, "Z" may indicate a first direction (+Z) or a second direction (−Z).

According to various embodiments, an electronic device (e.g., the electronic device 101 in FIGS. 1 and 2) may include one or more communication devices (e.g., the first, second, third, and fourth communication devices 221, 222, 223, and 224 of FIG. 2 and the communication device 300 in FIG. 3). The communication device may include a communication circuit (e.g., the communication circuit 300 in FIG. 3) and an antenna structure (e.g., the first and second antenna arrays 340 and 345 in FIG. 3).

Referring to FIGS. 4 and 5, the antenna structure 500 may have a plurality of stacked and arranged layers (e.g., a first layer 510, a second layer 520, a third layer 530, and a fourth layer 540). The plurality of layers may include a plurality of dielectric substrates (e.g., a first dielectric substrate 510*a*, a second dielectric substrate 520*a*, a third dielectric substrate 530*a*, and a fourth dielectric substrate 540*a*), and conductive plates (e.g., a first conductive plate 510*b*, a second conductive plate 520*b*, and a third conductive plate 530*b*), each having a grid structure composed of a combination of openings (e.g., slots or cavities) and/or conductive vias and disposed between the plurality of dielectric substrates. As another example, the antenna structure 500 may include feeding units 550 and a radiator 540*b* connected to some of the first, second, and third conductive plates 510*b*, 520*b*, and 530*b*.

According to various embodiments, in the antenna structure 500 a total of four layers may be stacked. For example, the antenna structure 500 may include the second layer 520, the third layer 530, and the fourth layer 540, which are oriented in the first direction (+Z) with respect to the first layer 510 to which the feeding units 550 are connected. Each of the first layer 510, the second layer 520, the third layer 530, and the fourth layer 540 may include at least one dielectric substrate and at least one conductive plate. However, the stacked structure of the antenna structure 500 is not limited to four layers, and may be provided with three or less layers or four or more layers for the efficiency of the antenna structure. For example, as the number of layers of the antenna structure increases, a resonance frequency bandwidth may increase.

According to various embodiments, the antenna structure 500 may have a plurality of regions which are formed in the same structure and arranged regularly or periodically. For example, the antenna structure 500 may be configured such that the first, second, and third conductive plates 510*b*, 520*b*, and 530*b* or the first, second, third, and fourth dielectric substrates 510*a*, 520*a*, 530*a*, and 540*a* arranged in the horizontal direction (X-axis and Y-axis directions) may form a 2*2 arrangement, and each of the layers may be provided in an array having the same structure. Each of the layers may be constituted by a total of four regions (e.g., a first region S1, a second region S2, a third region S3, and a fourth region S4), and the structures of the respective regions may be equal to each other. Hereinafter, the structure provided in the first region S1 will be described, and the description will be applied to the structures of the second, third, and fourth regions S2, S3, and S4.

According to various embodiments, the first layer 510 of the antenna structure 500 may include a base layer 510*c* on which the feeding units 550 are disposed, the first conductive plate 510*b*, and the first dielectric substrate 510*a*. With reference to the base layer 510*c*, the first dielectric substrate 510*a* and the first conductive plate 510*b* may be stacked and arranged in the first direction (+Z).

According to an embodiment, the feeding units 550 may be electrically connected to the radiator 540*b* provided on the front face of the antenna structure 500 to apply an RF signal current so as to supply an RF signal to the radiator 540*b* or to receive another RF signal received through the radiator 540*b*. The radiator 540*b* may be implemented in various forms such as a rod, a meander line, a patch, and a microstip. In addition, the radiator 540*b* may be electrically connected to the feeding units 550 to transmit and receive an RF signal in at least one frequency band.

According to an embodiment, the first dielectric substrate 510*a* may be disposed on the front face of the base layer 510*c*. The first dielectric substrate 510*a* may have the same size (e.g., area) as the base layer 510*c*, and may be stacked thereon. A plurality of first conductive vias 511 may be arranged in a region of the first dielectric substrate 510a. The plurality of first conductive vias 511 may pass through the first dielectric substrate 510a, may extend to the first conductive plate 510b in the first direction (+Z), and may extend to the base layer 510c in the second direction (−Z). For example, the plurality of first conductive vias 511 may extend to the second conductive plate 520b in the first direction (+Z) so as to provide an electrical connection from the feeding units 550 to the radiator 540b. As another example, an array of the plurality of first conductive vias 511 may be arranged in a closed line shape so as to provide a narrow beam of radio waves directed in a first direction (+Z) as a waveguide.

According to an embodiment, the first conductive plate 510b may be disposed on the front face of the first dielectric substrate 510a. The first conductive plate 510b may have the same size (e.g., area) as the first dielectric substrate 510a and/or the base layer 510c, and may be stacked thereon. The plurality of first conductive vias 511 may be arranged in a region of the first conductive plate 510b. The plurality of first conductive vias 511 are formed through the first conductive plate 510b, and a first coupling slot 513 may be disposed inside the array of the plurality of first conductive vias 511. The first coupling slot 513 is formed through the first conductive plate 510b, and may be disposed in the central region of the first conductive plate 510b.

According to various embodiments, the second layer 520 of the antenna structure 500 may include the second conductive plate 520b and the second dielectric substrate 520a. With reference to the first layer 510, the second dielectric substrate 520a and the second conductive plate 520b may be stacked and arranged in the first direction (+Z).

According to an embodiment, the second dielectric substrate 520a may be disposed on the front face of the first conductive plate 510b of the first layer 510. The second dielectric substrate 520a may have the same size (e.g., area) as the first conductive plate 510b of the first layer 510, and may be stacked thereon. A plurality of second conductive vias 521 may be arranged in a region of the second dielectric substrate 520a. The plurality of second conductive vias 521 may pass through the second dielectric substrate 520a, and may extend to the second conductive plate 520b in the first direction (+Z). For example, the plurality of second conductive vias 521 may be connected to the first layer 510, and may extend to the third conductive plate 530b in the first direction (+Z) so as to provide an electrical connection from the feeding units 550 to the radiator 540b. As another example, an array of the plurality of second conductive vias 521 may be arranged in a closed line shape so as to provide a narrow beam of radio waves directed in a first direction (+Z) as a waveguide.

According to an embodiment, the second conductive plate 520b may be disposed on the front face of the second dielectric substrate 520a. The second conductive plate 520b may have the same size (e.g., area) as the second dielectric substrate 520a, and may be stacked thereon. The plurality of second conductive vias 521 may be arranged in a region of the second conductive plate 520b. The plurality of second conductive vias 521 are formed through the second conductive plate 520b, and a second coupling slot 523 may be disposed inside the array of the plurality of second conductive vias 521. The second coupling slot 523 is formed through the second conductive plate 520b, and may be disposed in the central region of the second conductive plate 520b.

According to various embodiments, the third layer 530 of the antenna structure 500 may include the third conductive plate 530b and the third dielectric substrate 530a. With reference to the second layer 520, the third dielectric substrate 530a and the third conductive plate 530b may be stacked and arranged in the first direction (+Z).

According to an embodiment, the third dielectric substrate 530a may be disposed on the front face of the second conductive plate 520b of the second layer 520. The third dielectric substrate 530a may have the same size (e.g., area) as the second conductive plate 520b of the second layer 520, and may be stacked thereon. A plurality of third conductive vias 531 may be arranged in a region of the third dielectric substrate 530a. The plurality of third conductive vias 531 may pass through the third dielectric substrate 530a, and may extend to the third conductive plate 530b in the first direction (+Z). The plurality of third conductive vias 531 may extend so as to provide an electrical connection from the feeding units 550 to the radiator 540b.

According to an embodiment, the third conductive plate 530b may be disposed on the front face of the third dielectric substrate 530a. The third conductive plate 530b may have the same size (e.g., area) as the third dielectric substrate 530a, and may be stacked thereon. The plurality of third conductive vias 531 may be arranged in a region of the third conductive plate 530b. The plurality of third conductive vias 531 are formed through the third conductive plate 530b, and at least one cavity 533 may be disposed inside the array of the plurality of third conductive vias 531. The at least one cavity 533 may be provided in a circular shape, may be formed through the third conductive plate 530b, and may be disposed in the central region of the third conductive plate 530b.

According to various embodiments, the fourth layer 540 may be disposed on the front face of the third layer 530. The fourth layer 540 may include the fourth dielectric substrate 540a and the radiator 540b.

According to an embodiment, the fourth dielectric substrate 540a may be disposed on the front face of the third conductive plate 530b. The fourth dielectric substrate 540a may have the same size (e.g., area) as the third conductive plate 530b, and may be stacked thereon. According to an embodiment, the fourth dielectric substrate 540a may be disposed on the front face of the third conductive plate 530b of the third layer 530. The fourth dielectric substrate 540a may have the same size (e.g., area) as the third conductive plate 530b of the third layer 530, and may be stacked thereon.

According to an embodiment, a first parasitic conductive plate(s) 541 and a second parasitic conductive plate 543 may be disposed on the front face of the fourth dielectric substrate 540a. As another example, the front surface of the fourth dielectric substrate 540a may include a first line conductor(s) 545 and a second line conductor(s) 547. The first conductive plate 510b, the second conductive plate 520b, the first line conductor(s) 545, and the second line conductor(s) 547 may be provided as a radiator of the antenna structure 500.

Hereinafter, the fourth layer structure of the antenna structure 500 will be described in detail with reference to FIGS. 5 and 6.

Figure 6:
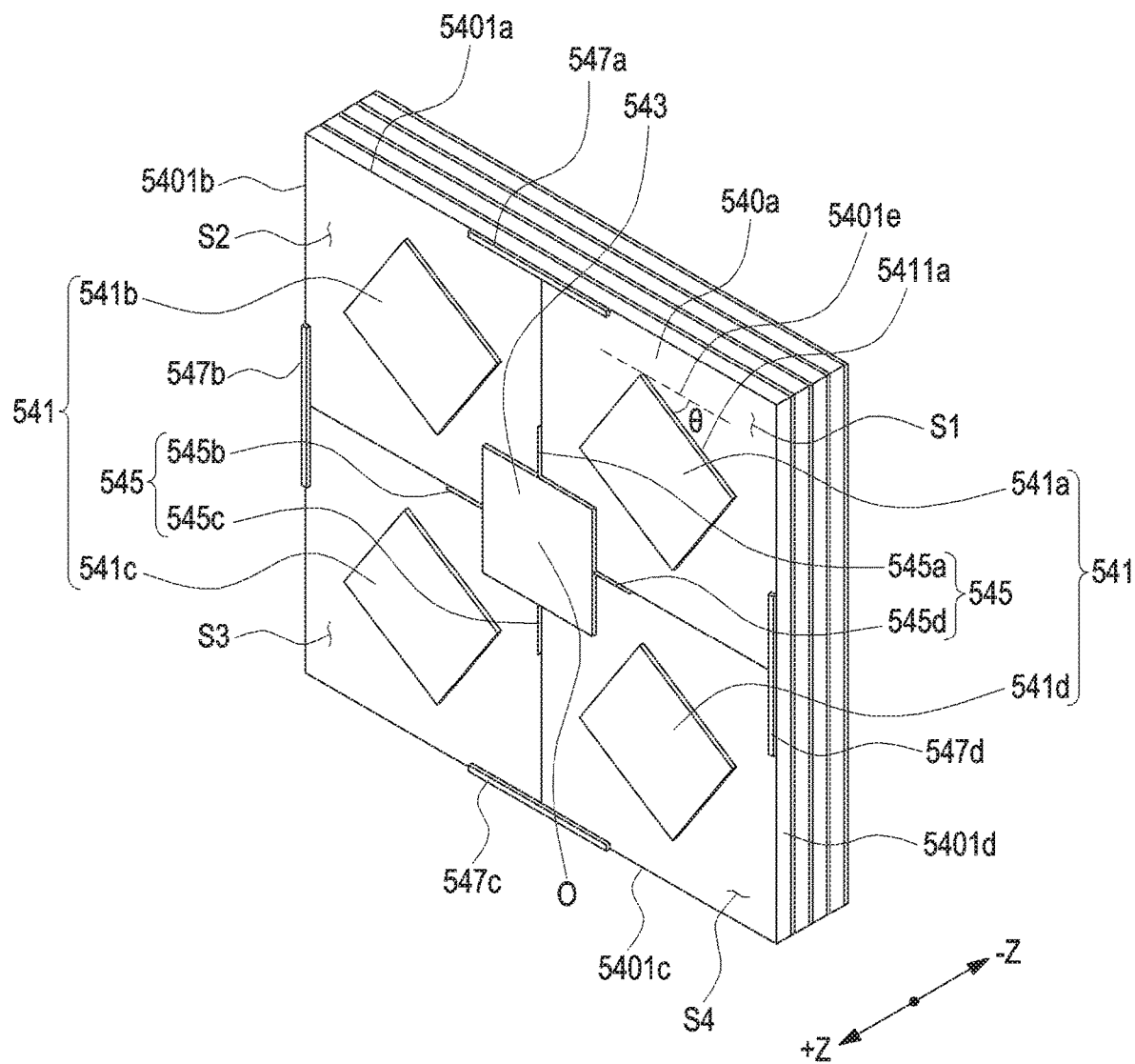
FIG. 6 is a perspective view illustrating a front face of an antenna structure of a communication device according to an embodiment of the disclosure.

FIG. 6 is a perspective view illustrating the front face of the antenna structure 500 of a communication device according to an embodiment of the disclosure.

Referring to FIGS. 5 and 6, the antenna structure 500 may have a plurality of stacked and arranged layers (e.g., the first layer 510, the second layer 520, the third layer 530, and the fourth layer 540). The plurality of layers may include a plurality of dielectric substrates (e.g., the first dielectric substrate 510a, the second dielectric substrate 520a, the third dielectric substrate 530a, and the fourth dielectric substrate 540a), and conductive plates (e.g., the first conductive plate 510b, the second conductive plate 520b, and the third conductive plate 530b) disposed between the plurality of dielectric substrates. The fourth layer 540 of the antenna structure may include the fourth dielectric substrate 540a and one or more parasitic conductive plates (e.g., first and second parasitic conductive plates 541 and 543) and the first and second line conductors 545 and 547 arranged on the fourth dielectric substrate 540a.

According to various embodiments, in the fourth dielectric substrate 540a, quadrants may be formed with respect to the center O thereof, and respective quadrants may be divided into the first, the second, the third, and the fourth regions S1, S2, S3, and S4. For example, the fourth dielectric substrate 540a may include the second region S2, the third region S3, and the fourth region S4 in a counterclockwise direction from the first region S1 disposed in the upper right end region, and the respective regions may be arranged to be in contact with each other. The first, the second, the third, and the fourth regions S1, S2, S3, and S4 may have the same area. The fourth dielectric substrate 540a may be utilized as a ground panel of the antenna structure 500.

According to an embodiment, the thickness of the fourth dielectric substrate 540a may be greater than the thickness of the one or more parasitic conductive plate and the thickness of the first and second line conductors 545 and 547 arranged on the fourth dielectric substrate 540a. For example, the fourth dielectric substrate 540a may have a thickness of about 0.408 mm to 0.608 mm. As another example, the fourth dielectric substrate 540a may have a thickness of about 0.508 mm.

According to an embodiment, the front face of the fourth dielectric substrate 540a may include the first parasitic conductive plate(s) 541 in a tetragonal shape and the second parasitic conductive plate 543 disposed to be spaced apart from the first parasitic conductive plate(s) 541. As another example, the front face of the fourth dielectric substrate 540a may include the first line conductor(s) 545 disposed adjacent to the second parasitic conductive plate 543 and the second line conductor(s) 547 disposed on the edge regions of the fourth dielectric substrate 540a.

According to an embodiment, a plurality of first parasitic conductive plates (i.e., first parasitic conductive plate(s) 541) may be disposed on a face directed in the first direction (+Z) of the fourth dielectric substrate 540a. For example, one first parasitic conductive plate 541 may be disposed in each of the first, the second, the third, and the fourth regions S1, S2, S3, and S4 formed by the fourth dielectric substrate 540a. The first parasitic conductive plate(s) 541 may serve as a radiator of the antenna structure 500.

The first parasitic conductive plate(s) 541 may be provided in a patch type. In addition, the first parasitic conductive plate(s) 541 may be electrically connected to the feeding units 550 so as to transmit and receive an RF signal in at least one frequency band. However, the first parasitic conductive plate(s) 541 is not limited to the patch type, and may be implemented in various types such as a rod, a meander line, and a microstrip in order to enhance the usability of the antenna structure.

According to an embodiment, a $(1\text{-}1)_{th}$ parasitic conductive plate 541a may be disposed in the center of the first region S1. The $(1\text{-}1)_{th}$ parasitic conductive plate 541a may be formed in a rectangular shape, and a resonance frequency may be determined by the length of the $(1\text{-}1)_{th}$ parasitic conductive plate 541a. As another example, a $(1\text{-}2)_{th}$ parasitic conductive plate 541b may be disposed in the center of the second region S2. The $(1\text{-}2)_{th}$ parasitic conductive plate 541b may be formed in a rectangular shape, and a resonance frequency may be determined by the length of the $(1\text{-}2)_{th}$ parasitic conductive plate 541b. As another example, a $(1\text{-}3)_{th}$ parasitic conductive plate 541c may be disposed in the center of the third region S3. The $(1\text{-}3)_{th}$ parasitic conductive plate 541c may be formed in a rectangular shape, and a resonance frequency may be determined by the length of the $(1\text{-}3)_{th}$ parasitic conductive plate 541c. As another example, a $(1\text{-}4)_{th}$ parasitic conductive plate 541d may be disposed in the center of the fourth region S4. The $(1\text{-}4)_{th}$ parasitic conductive plate 541d may be formed in a rectangular shape, and a resonance frequency may be determined by the length of the $(1\text{-}4)_{th}$ parasitic conductive plate 541d.

According to an embodiment, an array of first parasitic conductive plates (i.e., first parasitic conductive plate(s) 541) may be formed on one face of the fourth dielectric substrate 540a, and there may be various shapes thereof. For example, patch type first parasitic conductive plates 541 may be arranged on one face of the fourth dielectric substrate 540a so as to form an N*M antenna array (N and M are natural numbers). According to an embodiment, an array of first parasitic conductive plates may be disposed in a region adjacent to a side portion of an electronic device (e.g., the electronic device 101 in FIGS. 1 and 2). In another example, the array of first parasitic conductive plates may be positioned such that the first parasitic conductive plates 541 are spaced apart from each other in order to reduce the coupling effect of the antenna.

According to an embodiment, the circular polarization characteristic of the antenna may be determined by the size and rotation angle of the first parasitic conductive plate(s) 541. For example, the resonance frequency propagated into the air may be adjusted to about 5.8 GHz by adjusting the length and width of the patch formed by the first parasitic conductive plate(s) 541, and the resonance frequency may be adjusted to have a circular polarization characteristic by rotating the first parasitic conductive plate(s) 541. According to an embodiment, one edge of the $(1\text{-}1)_{th}$ parasitic conductive plate 541a disposed on the first region S1 may be located in the state of being rotated or tilted by a predetermined angle θ so as not to be parallel to one edge of the fourth dielectric substrate 540a so as not to be parallel to one edge of the first and second end portions. For example, one edge 5411a of the $(1\text{-}1)_{th}$ parasitic conductive plate 541a may be located in the state of being rotated by a predetermined angle θ with respect a virtual line 5401e parallel to a first edge 5401a of the fourth dielectric substrate 540a. The $(1\text{-}1)_{th}$ parasitic conductive plate 541a may set the circular polarization characteristic of the corresponding antenna differently depending on the rotated angle θ. As another example, the $(1\text{-}2)_{th}$ parasitic conductive plate 541b, the $(1\text{-}3)_{th}$ parasitic conductive plate 541c, and the $(1\text{-}4)_{th}$ parasitic conductive plate 541d may be located to be may be rotated or tilted so as to have an incline corresponding to that of the $(1\text{-}1)_{th}$ parasitic conductive plate 541a.

According to an embodiment, the thickness of the first parasitic conductive plate(s) 541 may be smaller than the thickness of the fourth dielectric substrate 540a. For example, the first parasitic conductive plate(s) 541 may have a thickness of about 0.050 mm to 0.100 mm. As another example, the first parasitic conductive plate(s) 541 may have a thickness of about 0.075 mm.

According to an embodiment, the second parasitic conductive plate 543 may be disposed on a face directed in the first direction (+Z) of the fourth dielectric substrate 540a.

The second parasitic conductive plate 543 may be disposed between the plurality of first parasitic conductive plate(s) 541. As another example, the second parasitic conductive plate 543 may be disposed so as to be spaced apart from the plurality of first parasitic conductive plate(s) 541. For example, the second parasitic conductive plate 543 may be located at a position surrounded by the positions where the $(1-1)_{th}$ parasitic conductive plate 541a, the $(1-2)_{th}$ parasitic conductive plate 541b, the $(1-3)_{th}$ parasitic conductive plate 541c, and the $(1-4)_{th}$ parasitic conductive plate 541d are arranged.

According to an embodiment, the second parasitic conductive plate 543 may be disposed in the central portion O of the fourth dielectric substrate 540a so as to be exposed in the first direction (+Z). For example, the second parasitic conductive plate 543 may be disposed so as to at least partially overlap each of the first, the second, the third, and the fourth regions S1, S2, S3, and S4 formed in the fourth dielectric substrate 540a. The second parasitic conductive plate 543 may serve as a radiator of the antenna structure 500. The second parasitic conductive plate 543 may be provided in a patch type. In addition, the second parasitic conductive plate 543 may be electrically connected to the feeding units 550 so as to transmit and receive an RF signal in at least one frequency band. However, the second parasitic conductive plate 543 is not limited to the patch type, and may be implemented in various types such as a rod, a meander line, and a microstrip in order to enhance the usability of the antenna structure.

According to an embodiment, the second parasitic conductive plate 543 may be provided in a square or rectangular shape, and antenna performance may be controlled by the size and the rotation angle of the second parasitic conductive plate 543, and the second parasitic conductive plate 543 may have a trade-off relationship with the first parasitic conductive plate(s) 541 in terms of the circular polarization characteristic. The thickness of the second parasitic conductive plate 543 may be smaller than the thickness of the fourth dielectric substrate 540a. For example, the second parasitic conductive plate 543 may have a thickness of about 0.050 mm to 0.100 mm. As another example, the second parasitic conductive plate 543 may have a thickness of about 0.075 mm.

According to an embodiment, when viewed from the front side of the antenna structure 500, the second parasitic conductive plate 543 is formed to overlap at least some of the third conductive vias (e.g., the plurality of third conductive vias 531 in FIG. 4) formed on the third dielectric substrate (e.g., the third dielectric substrate 530a in FIG. 5). As another example, the first line conductor(s) 545 may be disposed adjacent to the second parasitic conductive plate 543.

According to various embodiments, a plurality of first line conductors (i.e., first line conductor(s) 545) may be disposed on the front face of the fourth dielectric substrate 540a. The first line conductors 545 may be located in respective boundaries of the first, second, third, and fourth regions S1, S2, S3, and S4 of the fourth dielectric plate 540a. For example, the first line conductors 545 may include a $(1-1)_{th}$ line conductor 545a formed on the boundary between the first region S1 and the second region S2, a $(1-2)_{th}$ line conductor 545b formed on the boundary between the second region S2 and the third region S3, a $(1-3)_{th}$ line conductor 545c formed on the boundary between the third region S3 and the fourth region S4, and a $(1-4)_{th}$ line conductor 545d formed on the boundary between the fourth region S4 and the first region S1.

According to an embodiment, the ends of the $(1-1)_{th}$ line conductor 545a, the $(1-2)_{th}$ line conductor 545b, the $(1-3)_{th}$ line conductor 545c, and the $(1-4)_{th}$ line conductor 545d may be in contact with the respective edges of the second parasitic conductive plate 543 and may extend in the direction perpendicular to the edges. The first line conductor(s) 545 may be disposed between a plurality of the first parasitic conductive plate(s) 541 to generate coupling signals formed between the plurality of first parasitic conductive plates, thereby improving antenna performance.

According to an embodiment, the length of the first line conductor(s) 545 may be smaller than that of one edge of the first parasitic conductive plate(s) 541 or the second parasitic conductive plate 543. As another example, the length of the first line conductor(s) 545 may be smaller than half the length from one edge of the second parasitic conductive plate 543 to one edge of the fourth dielectric substrate 540a.

According to an embodiment, the $(1-1)_{th}$ line conductor 545a may be spaced apart from the $(1-3)_{th}$ line conductor 545c, which is opposite the $(1-1)_{th}$ line conductor 545a with respect the center O of the second parasitic conductive plate 543, by one wavelength 2. A standing wave of one wavelength λ, is generated through the $(1-1)_{th}$ line conductor 545a, the $(1-3)_{th}$ line conductor 545c, and the second parasitic conductive plate 543. As a result, beams are formed in the first direction (+Z) (e.g., upwards) from the antenna center O and the beams are collected toward the center O so as to form a narrow beam (increase of an antenna gain). As another example, the $(1-2)_{th}$ line conductor 545b may be spaced apart from the $(1-4)_{th}$ line conductor 545d, which is opposite the $(1-2)_{th}$ line conductor 545b with respect the center O of the second parasitic conductive plate 543, by one wavelength 2. A standing wave of one wavelength λ, is generated through the $(1-2)_{th}$ line conductor 545b, the $(1-4)_{th}$ line conductor 545d, and the second parasitic conductive plate 543. As a result, beams are formed in the first direction (+Z) (e.g., upwards) from the antenna center O and the beams are collected toward the center O so as to form a narrow beam (increase of an antenna gain).

According to an embodiment, the first line conductor(s) 545 may serve as a radiator of the antenna structure 500. The first line conductor(s) 545 may be provided in a rod type. In addition, the first line conductor(s) 545 may be electrically connected to the feeding units 550 so as to transmit and receive an RF signal in at least one frequency band. However, the first line conductor(s) 545 is not limited to the rod type, and may be implemented in various types such as a meander line, a patch, and a microstrip in order to enhance the usability of the antenna structure.

According to various embodiments, a plurality of second line conductors (i.e., the second line conductor(s) 547) may be disposed on the front face of the fourth dielectric substrate 540a. The second line conductors 547 may be located to be in contact with the respective ones of the four edges of the fourth dielectric substrate 540a. As another example, the second line conductors 547 may be located to pass through the respective boundaries of the first, second, third, and fourth regions S1, S2, S3, and S4 of the fourth dielectric substrate 540a. For example, the second line conductors 547 may include a $(2-1)_{th}$ line conductor 547a disposed to be in contact with the first edge 5401a of the fourth dielectric substrate 540a and formed to pass through at least a portion of the first region S1 and the second region S2. A $(2-2)_{th}$ line conductor 547b may be disposed to be in contact with a second edge 5401b of the fourth dielectric substrate 540a and formed to pass through at least a portion of the second region S2 and the third region S3. A $(2-3)_{th}$ line conductor 547c may be disposed to be in contact with a third edge 5401c of the fourth dielectric substrate 540a and formed to pass through at least a portion of the third region S3 and the fourth region S4. A $(2\text{-}4)_{th}$ line conductor 547d may be disposed to be in contact with a fourth edge 5401d of the fourth dielectric substrate 540a and formed to pass through at least a portion of the fourth region S4 and the first region S1.

According to an embodiment, the $(2\text{-}1)_{th}$ line conductor 547a, the $(2\text{-}2)_{th}$ line conductor 547b, the $(2\text{-}3)_{th}$ line conductor 547c, and the $(2\text{-}4)_{th}$ line conductor 547d may be disposed to be parallel to or perpendicular to the respective edges of the second parasitic conductive plate 543, and are installed on the respective edges of the fourth dielectric substrate 540a so as to radiate outwardly radiated antenna signals in the first direction (+Z), thereby improving antenna performance. Through the second line conductor(s) 547, it is possible to provide a narrow beam waveform by which antenna radiation is provided in the first direction (e.g., upwards).

According to an embodiment, the length of the second line conductor(s) 547 may be smaller than that of one side of the first parasitic conductive plate(s) 541 or the second parasitic conductive plate 543. As another example, the length of the second line conductor(s) 547 may be greater than the length of one side of the second parasitic conductive plate 543.

According to an embodiment, the $(2\text{-}1)_{th}$ line conductor 547a may be spaced apart from the second parasitic conductive plate 543, which is disposed in the center O of the fourth dielectric substrate 540a, by one wavelength λ. The $(2\text{-}1)_{th}$ line conductor 547a may have a length of λ/2, and may form an antenna beam in the first direction (+Z), similar to the characteristics of a dipole antenna. As another example, each of the $(2\text{-}2)_{th}$ line conductor 547b, the $(2\text{-}3)_{th}$ line conductor 547c, and the $(2\text{-}4)_{th}$ line conductor 547d may be spaced apart from the second parasitic conductive plate 543 by one wavelength λ. The $(2\text{-}2)_{th}$ line conductor 547b, the $(2\text{-}3)_{th}$ line conductor 547c, and $(2\text{-}4)_{th}$ line conductor 547d may have a length of about λ/2, and may form an antenna beam in the first direction (+Z), similar to the characteristics of a dipole antenna.

According to an embodiment, the second line conductor(s) 547 may serve as a radiator of the antenna structure 500. The second line conductor(s) 547 may be provided in a rod type. In addition, the second line conductor(s) 547 may be electrically connected to the feeding units 550 so as to transmit and receive an RF signal in at least one frequency band. However, the second line conductor(s) 547 is not limited to the rod type, and may be implemented in various types such as a meander line, a patch, and a microstrip in order to enhance the usability of the antenna structure.

Figure 7:
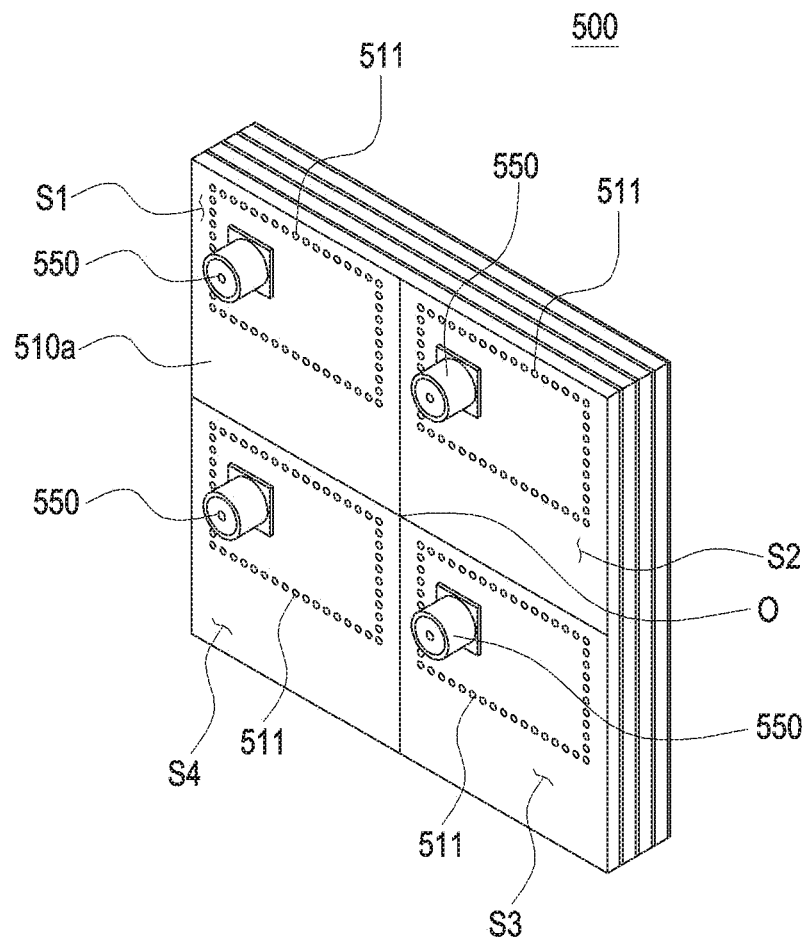
FIG. 7 is a perspective view illustrating a feeding unit disposed on a rear face of an antenna structure of a communication device according to an embodiment of the disclosure.

FIG. 7 is a perspective view illustrating a feeding unit disposed on a rear face of an antenna structure of a communication device according to an embodiment of the disclosure.

Figure 8:
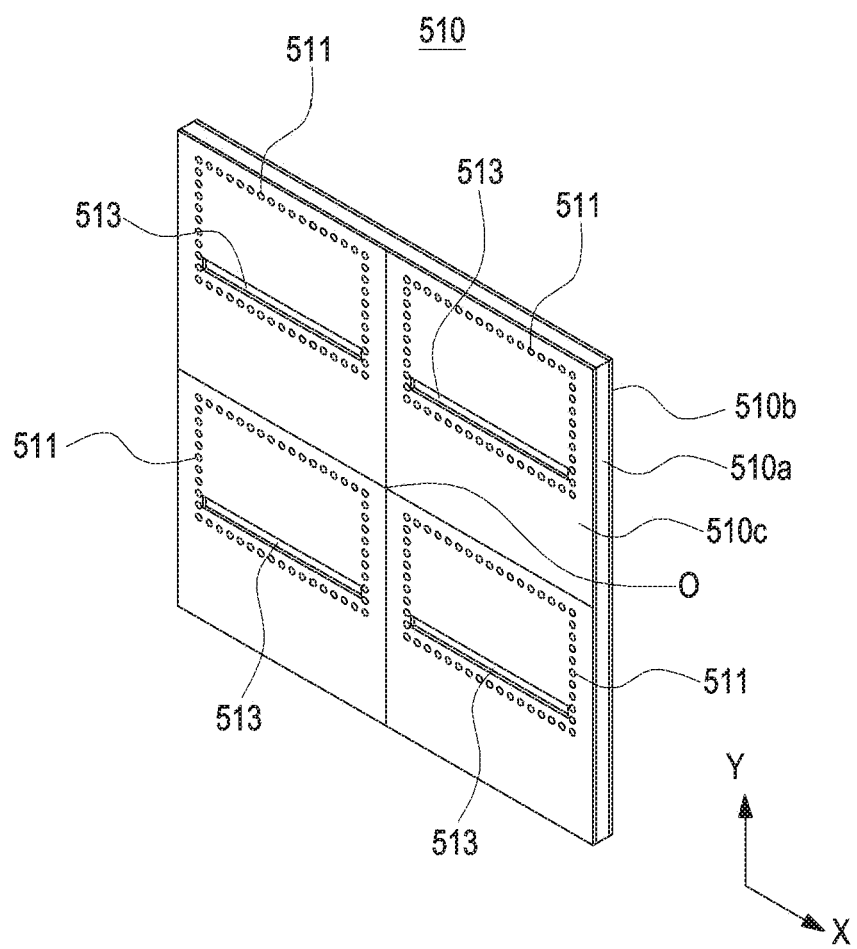
FIG. 8 is a perspective view illustrating a first layer of an antenna structure according to an embodiment of the disclosure.

FIG. 8 is a perspective view illustrating a first layer of an antenna structure according to an embodiment of the disclosure.

Referring to FIGS. 7 and 8, the first layer 510 of the antenna structure 500 may include the base layer 510c, the first dielectric substrate 510a, and the first conductive plate 510b. As another example, at least one feeding unit (i.e., one of feeding units 550) may be connected to the rear surface of the base layer 510c. The structure of the first layer 510 and the feeding units 550 of the antenna structure 500 of FIGS. 7 and 8 may be partially or entirely equal to that of the first layer 510 and the feeding units 550 of the antenna structure 500 of FIG. 4.

According to various embodiments, the feeding units 550 may be provided as an SMP connector, which may be electrically connected to an SMP coaxial cable by a male-female coupling. The feeding units 550 may be disposed in a direction perpendicular to the base layer 510c, and may be directly connected to the first conductive plate 510b. The feeding units 550 may utilize at least some of the plurality of first conductive vias 511 of the first layer 510 in order to prevent loss due to power feeding.

According to various embodiments, the first layer 510 may have a structure in which the base layer 510c, the first dielectric substrate 510a, and the first conductive plate 510b are stacked. In the first layer 510 including the base layer 510c, quadrants having the same area may be formed around the center O. The faces of respective quadrants may be divided into the first, the second, the third, and the fourth regions S1, S2, S3, and S4. For example, the base layer 510c may include the second region S2, the third region S3, and the fourth region S4 in a counterclockwise direction from the first region S1 disposed in the upper right end region, and the respective regions may be arranged to be in contact with each other (see FIG. 7). Each of the first, the second, the third, and the fourth regions S1, S2, S3, and S4 may be provided with an opening in at least one region, and the feeding units 550 having a line extending to the first conductive plate 510b may be disposed in the opening.

According to an embodiment, in the first region S1 of the base layer 510c, the plurality of first conductive vias 511 may be disposed to surround the opening where the feeding units 550 are disposed. The plurality of first conductive vias 511 may be arranged in a tetragonal shape, and the plurality of first conductive vias 511 may be formed through the first dielectric substrate 510a so as to be connected to the first conductive plate 510b. The array structure formed by the plurality of first conductive vias 511 formed through the first layer 510 prevents the loss of radio waves entering from the feeding units 550 and guides and transmits the radio waves in the first direction (+Z). In the second, the third, and the fourth regions S2, S3, and S4 of the base layer 510c, the shape of the first region S1 and the array structure of the plurality of first conductive vias 511 in the first region S1 are applied.

According to an embodiment, the thickness of the base layer 510c may be smaller than the thickness of the first dielectric substrate 510a. For example, the base layer 510c may have a thickness of about 0.050 mm to 0.100 mm. As another example, the base layer 510c may have a thickness of about 0.075 mm. The base layer 510c may include a metal material.

According to various embodiments, the plurality of first conductive vias 511 extending from the first region S1 of the base layer 510c may be formed in the first region S1 of the first dielectric substrate 510a. The plurality of first conductive vias 511 may be arranged in a tetragonal shape, and the plurality of first conductive vias 511 may be formed through the first dielectric substrate 510a so as to be connected to the first conductive plate 510b. Depending on the length of the plurality of first conductive vias 511 formed through the first layer 510, the resonance frequency and matching characteristics of the antenna may be determined. In the second, the third, and the fourth regions S2, S3, and S4 of the first dielectric substrate 510a, the shape of the first region S1 and the array structure of the plurality of first conductive vias 511 in the first region S1 are applied.

According to an embodiment, the thickness of the first dielectric substrate 510a may be larger than those of the base layer 510c and the first conductive plate 510b. For example, the first dielectric substrate 510a may have a thickness of about 0.408 mm to 0.608 mm. As another example, the first dielectric substrate 510a may have a thickness of about 0.508 mm.

According to an embodiment, the plurality of first conductive vias 511 extending from the first dielectric substrate 510a may be provided in the first region S1 of the first conductive plate 510b. As another example, the first coupling slot 513 may be provided in the first region Si. The first coupling slot 513 may be formed in a long opening shape so as to extend in the horizontal direction (the X-axis or Y-axis direction). The first coupling slot 513 is provided inside the rectangular array formed by the plurality of first conductive vias 511, and may be arranged in a shape corresponding to the longitudinal direction of the rectangular array. Depending on the length of the first coupling slot 513, the resonance frequency of the antenna may be determined, and depending on the width of the first coupling slot 513, the matching characteristics of the antenna may be determined.

According to an embodiment, the thickness of the first conductive plate 510b may be smaller than the thickness of the first dielectric substrate 510a. For example, the first conductive plate 510b may have a thickness of about 0.10 mm to 0.20 mm. As another example, the first conductive plate 510b may have a thickness of about 0.15 mm. The first conductive plate 510b may include a metal material, and at least a portion of the first conductive plate 510b may be utilized as a ground panel of the antenna structure 500. In the second, the third, and the fourth regions S2, S3, and S4 of the first conductive plate 510b, the shape and array of the first region S1 are applied.

Figure 9:
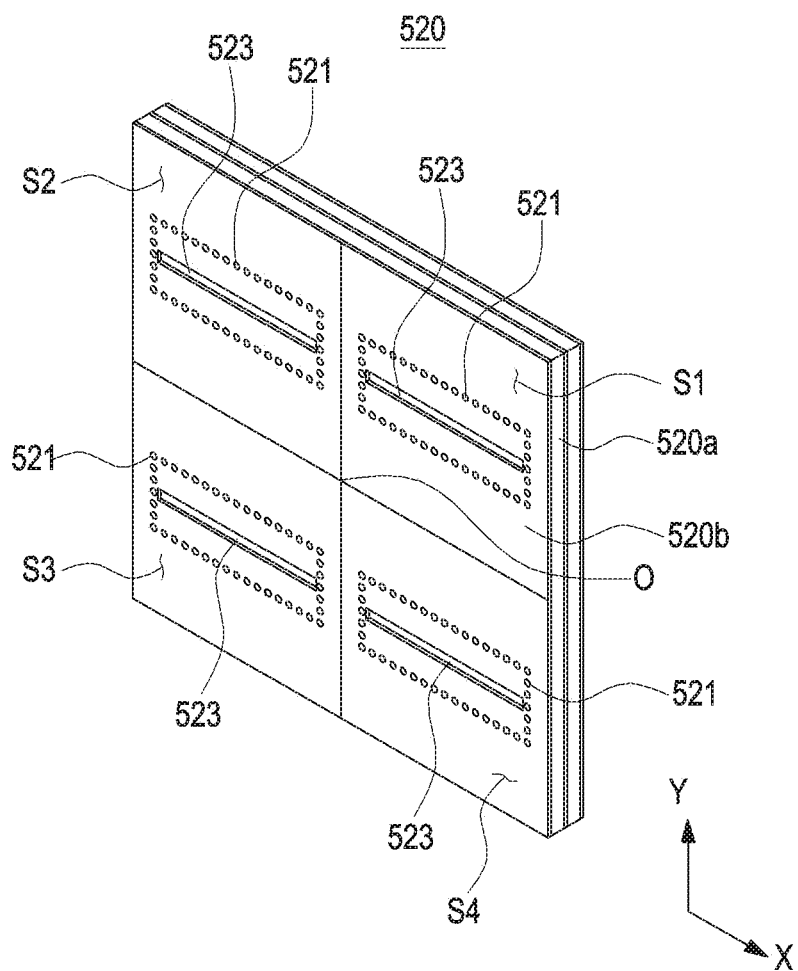
FIG. 9 is a perspective view illustrating a second layer of an antenna structure according to an embodiment of the disclosure.

FIG. 9 is a perspective view illustrating a second layer of an antenna structure according to an embodiment of the disclosure.

Referring to FIGS. 5 and 9, the second layer 520 of the antenna structure 500 may include the second dielectric substrate 520a and the second conductive plate 520b. The structure of the second layer 520 of the antenna structure 500 of FIG. 9 may be partially or entirely equal to that of the second layer 520 of the antenna structure 500 of FIG. 4.

According to various embodiments, the second layer 520 may have a structure in which the second dielectric substrate 520a and the second conductive plate 520b are stacked. In the second layer 520, quadrants having the same area may be formed around the center O. The faces of respective quadrants may be divided into the first, the second, the third, and the fourth regions S1, S2, S3, and S4. For example, the second dielectric substrate 520a may include the second region S2, the third region S3, and the fourth region S4 in a counterclockwise direction from the first region S1 disposed in the upper right end region, and the respective regions may be arranged to be in contact with each other.

According to various embodiments, the plurality of second conductive vias 521 may be formed in the first region S1 of the second dielectric substrate 520a. The plurality of second conductive vias 521 may be arranged in a tetragonal shape, and the plurality of second conductive vias 521 may be formed through the first dielectric substrate 510a so as to be connected to the second conductive plate 520b. The tetragonal arrays of the plurality of second conductive vias 521 may be formed at positions different from those of the tetragonal arrays of the plurality of first conductive vias 511. For example, the tetragonal array of the plurality of second conductive vias 521 may be arranged in the central region of the first region S1, and may provide a relatively small internal area compared to the tetragonal array of the plurality of first conductive vias 511. Depending on the length of the plurality of second conductive vias 521 formed through the second layer 520, the resonance frequency and matching characteristics of the antenna may be determined. In the second, the third, and the fourth regions S2, S3, and S4 of the second dielectric substrate 520a, the shape of the first region S1 and the array structure of the plurality of second conductive vias 521 in the first region S1 are applied.

According to an embodiment, the thickness of the second dielectric substrate 520a may be larger than the thickness of the second conductive plate 520b. For example, the second dielectric substrate 520a may have a thickness of about 0.408 mm to 0.608 mm. As another example, the second dielectric substrate 520a may have a thickness of about 0.508 mm.

According to an embodiment, the plurality of second conductive vias 521 extending from the second dielectric substrate 520a may be provided in the first region S1 of the second conductive plate 520b. As another example, the second coupling slot 523 may be provided in the first region S1. The second coupling slot 523 may be formed in a long opening shape so as to extend in the horizontal direction (the X-axis or Y-axis direction). The second coupling slot 523 is provided inside the rectangular array formed by the plurality of third conductive vias 531, and may be arranged in a shape corresponding to the longitudinal direction of the rectangular array. Depending on the length of the second coupling slot 523, the resonance frequency of the antenna may be determined, and depending on the width of the second coupling slot 523, the matching characteristics of the antenna may be determined.

According to an embodiment, the thickness of the second conductive plate 520b may be smaller than the thickness of the second dielectric substrate 520a. For example, the second conductive plate 520b may have a thickness of about 0.10 mm to 0.20 mm. As another example, the second conductive plate 520b may have a thickness of about 0.15 mm. The second conductive plate 520b may include a metal material, and at least a portion of the second conductive plate 520b may be utilized as a ground panel of the antenna structure 500. In the second, the third, and the fourth regions S2, S3, and S4 of the second conductive plate 520b, the shape and array of the first region S1 are applied.

Figure 10:
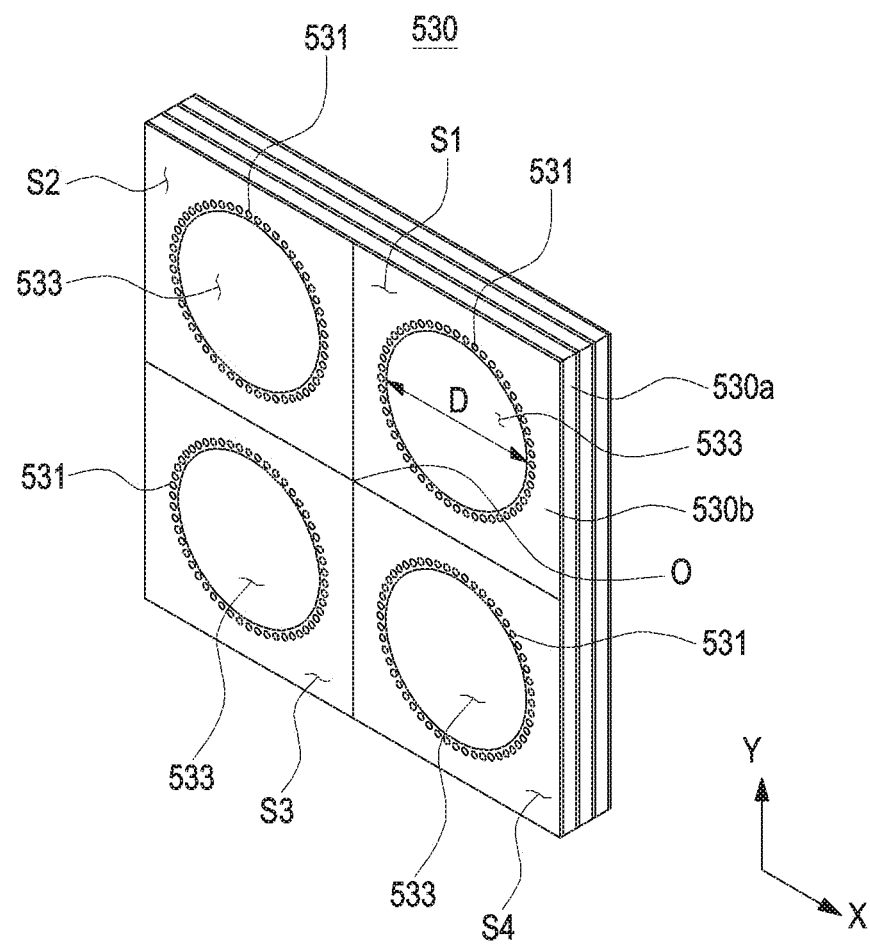
FIG. 10 is a perspective view illustrating a third layer of an antenna structure according to an embodiment of the disclosure.

FIG. 10 is a perspective view illustrating a third layer of the antenna structure according to an embodiment of the disclosure.

Referring to FIGS. 5 and 10, the third layer 530 of the antenna structure 500 may include the third dielectric substrate 530a and the third conductive plate 530b. The structure of the third layer 530 of the antenna structure 500 of FIG. 10 may be partially or entirely equal to that of the third layer 530 of the antenna structure 500 of FIG. 4.

According to various embodiments, the third layer 530 may have a structure in which the third dielectric substrate 530a and the third conductive plate 530b are stacked. In the third layer 530, quadrants having the same area may be formed around the center O. The faces of respective quadrants may be divided into the first, the second, the third, and the fourth regions S1, S2, S3, and S4. For example, the third dielectric substrate 530a may include the second region S2, the third region S3, and the fourth region S4 in a counterclockwise direction from the first region S1 disposed in the upper right end region, and the respective regions may be arranged to be in contact with each other.

According to various embodiments, the plurality of third conductive vias 531 may be formed in the first region S1 of the third dielectric substrate 530*a*. The plurality of third conductive vias 531 may be arranged in a ring shape, and the plurality of third conductive vias 531 may be formed through the third dielectric substrate 530*a* so as to be connected to the third conductive plate 530*b*. The ring-shaped array of the plurality of third conductive vias 531 is formed along the periphery of a circular cavity (i.e., the at least one cavity 533) disposed therein and is capable of serving as a cavity hole so as to reduce the loss of radio waves. As another example, the ring-shaped array of the plurality of third conductive vias 531 may serve as a guide for radio waves directed in the first direction (+Z) together with the at least one cavity 533. Depending on the length of the plurality of third conductive vias 531 formed through the third layer 530, the resonance frequency and matching characteristics of the antenna may be determined. In the second, the third, and the fourth regions S2, S3, and S4 of the third dielectric substrate 530*a*, the shape of the first region S1 and the array structure of the plurality of third conductive vias 531 in the first region S1 are applied.

According to an embodiment, the thickness of the third dielectric substrate 530*a* may be larger than the thickness of the third conductive plate 530*b*. For example, the third dielectric substrate 530*a* may have a thickness of about 0.408 mm to 0.608 mm. As another example, the third dielectric substrate 530*a* may have a thickness of about 0.508 mm.

According to an embodiment, the plurality of third conductive vias 531 extending from the third dielectric substrate 530*a* may be provided in the first region S1 of the third conductive plate 530*b*. As another example, the at least one cavity 533 may be provided in the first region Si. The center of each of the at least one cavity 533 is disposed on the same line as the center of the first region S1, and the cavity 533 may be provided in a circular shape. The area of each of the at least one cavity 533 may be larger than that of the first coupling slot 513 and the second coupling slot 523. The at least one cavity 533 may be provided inside the ring-shaped array formed by the plurality of third conductive vias 531. Depending on the size of the diameter D of the at least one cavity 533, the performance and efficiency of the antenna may be determined. For example, it is possible to maximize the gain of a single resonance frequency by inducing the narrow band matching characteristic of the antenna depending on the diameter D of the at least one cavity 533. Further, it is possible to maximize the gain (e.g., radiation efficiency) of the array antenna by forming a narrow beam in the first direction (+Z) (e.g., upwards) through the plurality of parasitic conductive plates in the upper portion of the antenna structure.

According to an embodiment, the thickness of the third conductive plate 530*b* may be smaller than the thickness of the third dielectric substrate 530*a*. For example, the third conductive plate 530*b* may have a thickness of about 0.10 mm to 0.20 mm. As another example, the third conductive plate 530*b* may have a thickness of about 0.15 mm. The third conductive plate 530*b* may include a metal material, and at least a portion of the third conductive plate 530*b* may be utilized as a ground panel of the antenna structure 500. In the second, the third, and the fourth regions S2, S3, and S4 of the third conductive plate 530*b*, the shape and array of the first region S1 are applied.

Figure 11:
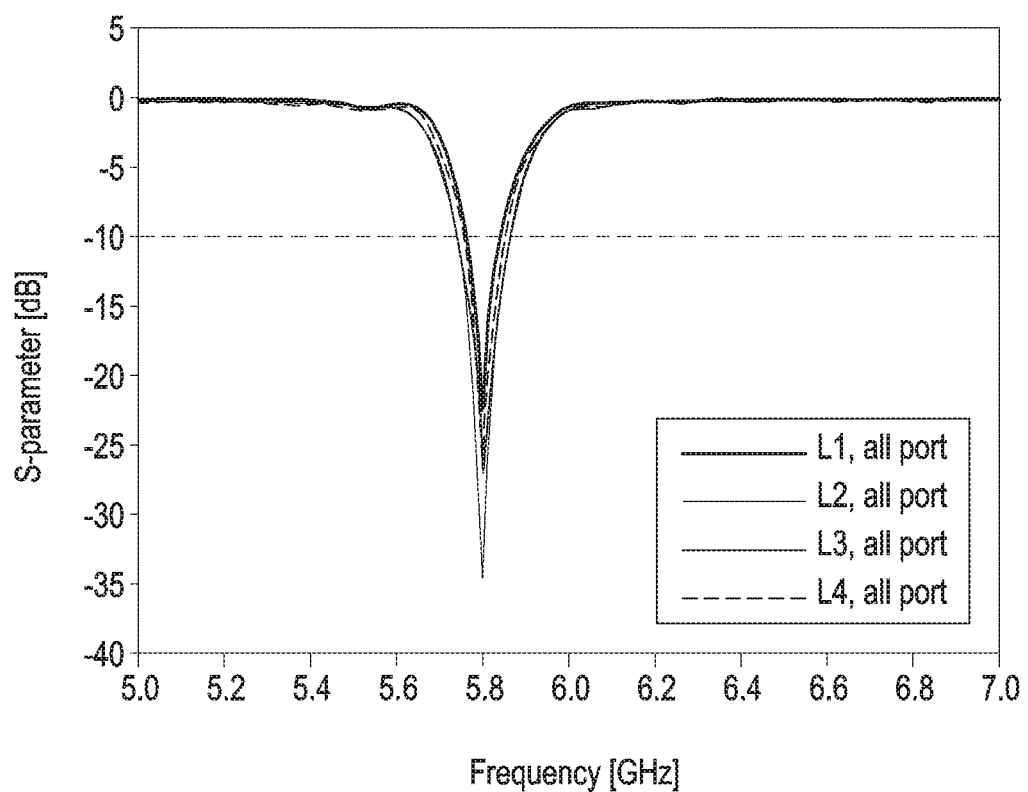
FIG. 11 is a graph showing a return loss for each frequency band of a 2*2 array antenna structure according to an embodiment of the disclosure.

FIG. 11 is a graph showing a return loss for each frequency band of a 2*2 array antenna structure according to an embodiment of the disclosure.

Referring to FIG. 11, it can be confirmed that the antenna structure 500 exhibits a reflection loss depending on the frequency range. The signal transmitted and/or received in the antenna structure 500 may be a first signal having a first frequency between 5.6 GHz and 6.0 GHz. According to an embodiment, the antenna structure may have a configuration including the wireless communication circuit and the communication device of FIGS. 1 and 2, and the communication device may include a communication circuit (e.g., the communication circuit 330 in FIG. 3) and an antenna structure (e.g., the antenna structure 500 in FIGS. 4 to 9).

According to various embodiments, the communication device including the antenna structure may be designed to operate in the frequency bands of 5.6 GHz and 6.0 GHz. The feeding units (e.g., smp ports) disposed in the respective ones of the divided regions represented in FIG. 7 may show similar types of graphs. For example, Line L1 may indicate the degree of reflection loss for each frequency band in the antenna structure in which power feeding is performed through the feeding unit disposed in the first region S1, Line L2 may indicate the degree of reflection loss for each frequency band in the antenna structure in which power feeding is performed through the feeding unit disposed in the second region S2, Line L3 may indicate the degree of reflection loss for each frequency band in the antenna structure in which power feeding is performed through the feeding unit disposed in the third region S3, and Line L4 may indicate the degree of reflection loss for each frequency band in the antenna structure in which power feeding is performed through the feeding unit disposed in the fourth region S4.

According to various embodiments, the antenna device may be equipped with a plurality of parasitic conductive plates so as to provide an antenna return loss with improved antenna performance and circular polarization characteristics. Four feeding units disposed in respective regions form similar types of graphs in the 5.6 GHz and 6.0 GHz frequency bands, all of which are capable of ensuring a return loss of less than −20 dB. Since a communication device including the antenna structure described above is intended to use a single resonance frequency, the antenna having a narrow band characteristic is capable of improving the performance of the antenna.

Figure 12:
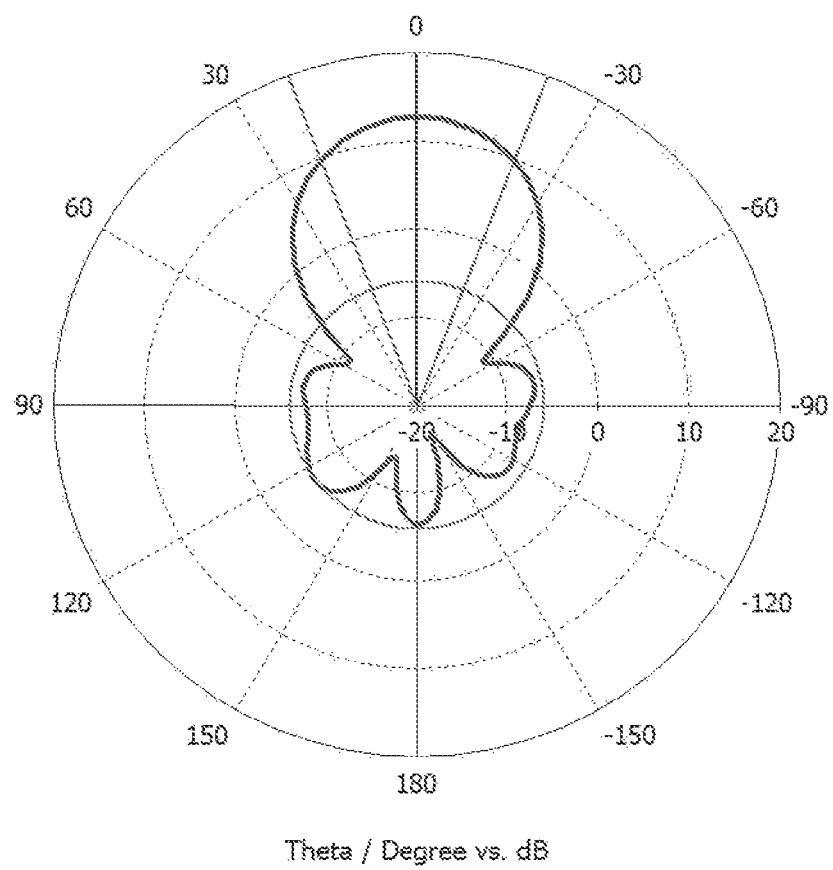
FIG. 12 is a graph showing a directivity of a 2*2 array antenna structure according to an embodiment of the disclosure.

FIG. 12 is a graph showing the directivity of a 2*2 array antenna structure according to an embodiment of the disclosure.

Figure 13:
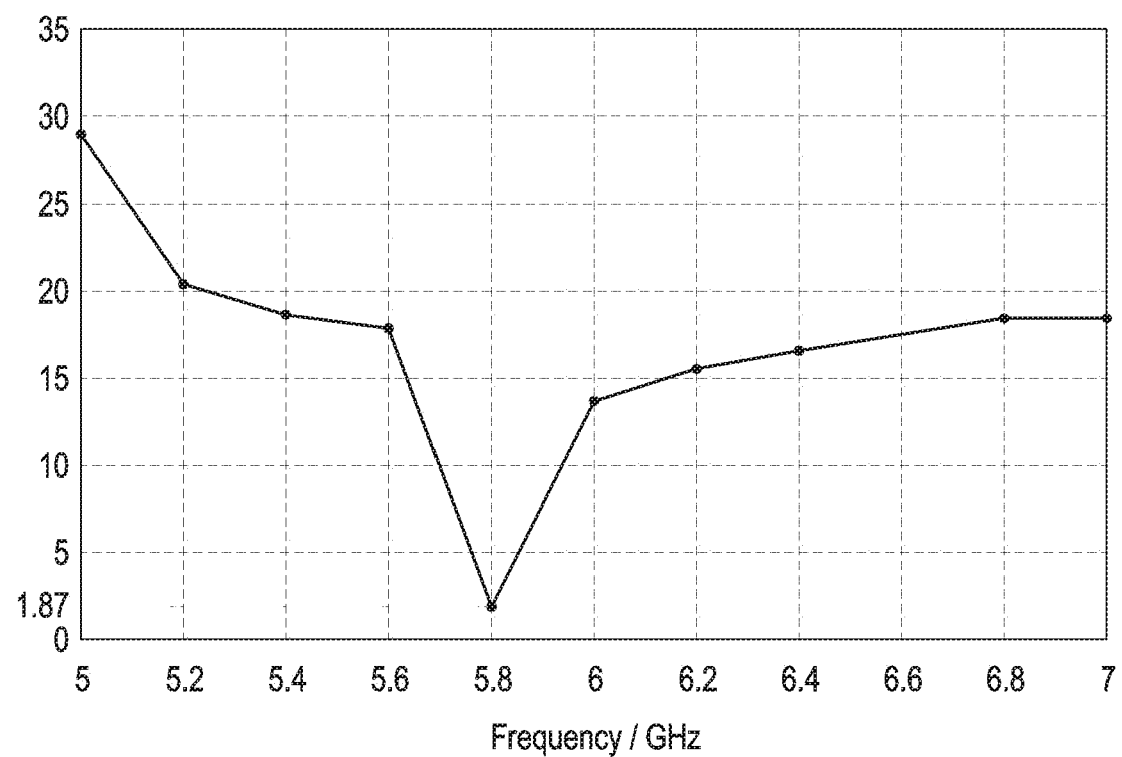
FIG. 13 is a graph showing a realized gain according to a beam pattern of a 2*2 array antenna structure according to an embodiment of the disclosure.

FIG. 13 is a graph showing a realized gain according to a beam pattern of a 2*2 array antenna structure according to an embodiment of the disclosure.

Referring to FIGS. 12 and 13, a signal transmitted and/or received in the antenna structure may be a first signal having a first frequency between 5.6 GHz and 6.0 GHz. According to an embodiment, the antenna structure may have a configuration including the wireless communication circuit and the communication device of FIGS. 1 and 2, and the communication device may include a communication circuit (e.g., the communication circuit 330 in FIG. 3) and an antenna structure (e.g., the antenna structure 500 in FIGS. 4 to 9).

According to various embodiments, it can be confirmed that an antenna structure including a plurality of parasitic conductive plates improves directivity. For example, an antenna structure including a plurality of parasitic conductive plates has a main lobe magnitude of about 12.77 dBi at a resonance frequency of 5.8 GHz. It can be confirmed that the size of a sub-lobe is reduced and the size of a main lobe is improved through the plurality of parasitic conductive plates in the antenna structure. This shows a 0.5 to 1.0 dB increase compared to an antenna structure in which the number of parasitic conductive plates is less than that of the antenna structure of the disclosure. As another example, an antenna structure including a plurality of parasitic conductive plates may provide a narrow beam directed upwards in the antenna structure as the angular width thereof indicates about 41.9 degrees.

According to various embodiments, it can be confirmed that an antenna structure including a parasitic conductive plate ensures an axial ratio of 1.87 dB. This shows a 0.3 to 0.8 dB increase compared to an antenna structure in which the number of parasitic conductive plates is less than that of the antenna structure of the disclosure.

According to various embodiments, an antenna structure including a plurality of parasitic conductive plates is capable of inherently providing high performance in a single antenna and is capable of inducing miniaturization by manufacturing the antenna structure in a stacked structure. Therefore, it is possible to maximize antenna performance by adding a plurality of parasitic conductive plates to the 2*2 array antenna.

An antenna structure (e.g., the antenna structure 500 in FIG. 4), according to various embodiments of the disclosure, may include: at least one feeding unit (e.g., the feeding units 550 in FIG. 4); a plurality of dielectric substrates (e.g., the first, second, third, and fourth dielectric substrates 510a, 520a, 530a, and 540a in FIG. 6); a plurality of conductive plates (e.g., the first, second, and third conductive plates 510b, 520b, and 530b in FIG. 6) disposed between the plurality of dielectric substrates and including at least one opening; and a radiator (e.g., the radiator 540b in FIG. 4) electrically connected to the feeding unit through conductive vias in the dielectric substrates or the conductive plates. The radiator may include a plurality of first parasitic conductive plates (e.g., the first parasitic conductive plates 541 in FIG. 6) spaced apart from each other, and a second parasitic conductive plate (e.g., the second parasitic conductive plate 543 in FIG. 6) disposed between the plurality of first parasitic conductive plates and spaced apart from the first parasitic conductive plates.

According to various embodiments, the radiator may include a plurality of first line conductors (e.g., the first line conductors 545 in FIG. 6), which are disposed to be in contact with portions of respective edges of the second parasitic conductive plate and to be spaced apart from each other.

According to various embodiments, the radiator includes a plurality of second line conductors (e.g., the second line conductor(s) 547 in FIG. 4) disposed perpendicular to respective longitudinal directions of the first line conductors and disposed in respective edges of a dielectric substrate on which the second parasitic conductive plate is disposed so as to provide a narrow beam of the antenna structure in a first direction.

According to various embodiments, the first line conductors may be arranged such that the first line conductors are in contact with the respective ones of the edges of the second parasitic conductive plate at one end thereof, and the first line conductors may extend from the one end thereof perpendicular to the respective ones of the edges of the second parasitic conductive plate. The distance between the first line conductors disposed on opposite sides of the second parasitic conductive plate may be spaced apart from each other by a distance corresponding to one wavelength λ.

According to various embodiments, the second line conductors may be disposed on opposite ends of the dielectric substrate with the second parasitic conductive plate interposed therebetween, and one edge of the second parasitic conductive plates may be spaced apart from the second line conductor facing the one edge by a distance corresponding to one wavelength λ. The length of the second parasitic conductive plates may be λ/2.

According to various embodiments, the first parasitic conductive plates and the second parasitic conductive plate may be disposed on a flat face of one of the dielectric substrates to be spaced apart from each other, and the first parasitic conductive plates or the second parasitic conductive plate may have a rectangular shape.

According to various embodiments, each edge of the second parasitic conductive plate may be parallel to one of edges of a dielectric substrate having a rectangular shape, and at least one edge of the first parasitic conductive plates may be disposed in a state of being rotated by a predetermined angle relative to at least one edge of the dielectric substrate to provide a resonance frequency at which circular polarization appears.

According to various embodiments, four first parasitic conductive plates may be provided and arranged to have a 2*2 array, and the center of the second parasitic conductive plate may be arranged on the same line as a center of the 2*2 array.

According to various embodiments, at least one of the plurality of dielectric substrates and at least one of the plurality of conductive plates may form one layer in the antenna structure, and a first layer may include a first dielectric substrate, a first conductive plate stacked on the first dielectric substrate, and a plurality of first conductive vias extending to the first conductive plate through the first dielectric substrate.

According to various embodiments, the first conductive plate may include a first coupling slot provided inside a rectangular array formed by the first conductive vias, and the resonance frequency of an antenna may be based on the length of the first coupling slot, and the matching characteristic of the antenna may be based on the width of the first coupling slot.

According to various embodiments, a second layer may include a second dielectric substrate, a second conductive plate stacked on the second dielectric substrate, and a plurality of second conductive vias extending to the second conductive plate through the second dielectric substrate, and an array of the plurality of second conductive vias may be different from an array of the first conductive vias.

According to various embodiments, the second conductive plate may include a second coupling slot provided inside a rectangular array formed by the second conductive vias, and the resonance frequency of an antenna may be based on the length of the second coupling slot, and the matching characteristic of the antenna may be based on the width of the second coupling slot.

According to various embodiments, a third layer may include a third dielectric substrate, a third conductive plate stacked on the third dielectric substrate, and a plurality of third conductive vias extending to the third conductive plate through the third dielectric substrate, and an array of the plurality of third conductive vias may be different from the array of the first conductive vias and the array of the second conductive vias.

According to various embodiments, the third conductive plate may include a cavity provided inside a ring-shaped array formed by the third conductive vias, and the cavity may induce a narrow band matching characteristic depending on the size of a diameter thereof.

According to various embodiments, an arrangement of the first parasitic conductive plates and the second parasitic conductive plate are configured to transmit/receive a first signal having a first frequency ranging from 3 GHz to 10 GHz.

An antenna structure, according to various embodiments, may include: at least one feeding unit; a first layer connected to the at least one feeding unit and including a first conductive plate; a second layer disposed on a front face of the first layer and including a second conductive plate; a third layer disposed on the front face of the second layer and including a third conductive plate; and a fourth layer disposed on the front face of the third layer and including a radiator electrically connected to the at least one feeding unit through conductive vias. The radiator may include: a plurality of first parasitic conductive plates spaced apart from each other; and a second parasitic conductive plate disposed between the plurality of first parasitic conductive plates and spaced apart from the first parasitic conductive plates.

According to various embodiments, the fourth layer may include a dielectric substrate on which the plurality of first parasitic conductive plates and the second parasitic conductive plate are disposed, edges of the second conductive plate may be disposed to be parallel to respective edges of the dielectric substrate, and at least one edge of the first parasitic conductive plates may be disposed in a state of being rotated by a predetermined angle relative to at least one edge of the dielectric substrate to provide a resonance frequency at which circular polarization appears.

According to various embodiments, the radiator may include: a plurality of first line conductors disposed to be in contact with a portion of one of edges of the second parasitic conductive plate, the first line conductors extending perpendicular to the respective ones of the edges of the second parasitic conductive plate and being spaced apart from each other; and a plurality of second line conductors disposed perpendicular to respective longitudinal directions of the first line conductors and disposed in respective edges of the dielectric substrate so as to provide a narrow beam of the antenna structure upwards.

According to various embodiments, the first conductive plate may include an array of first conductive vias formed therethrough and a first coupling slot disposed adjacent to the array of the first conductive vias, and the second conductive plate may include an array of second conductive vias formed therethrough and a second coupling slot disposed adjacent to the array of the second conductive vias.

According to various embodiments, the third conductive plate may include an array of third conductive vias formed therethrough and a cavity disposed inside the array of the third conductive vias, which has a ring shape.

An electronic device according to various embodiments may include: a housing; a printed circuit board disposed within the housing; a processor mounted on the printed circuit board; and an antenna structure disposed inside or outside the housing. The antenna structure may include: a feeding unit; a dielectric substrate; an array of first parasitic conductive plates disposed on the dielectric plate to be spaced apart from each other; a second parasitic conductive plate disposed in a center of the array of the first parasitic conductive plates; first line conductors disposed to be in contact with the second parasitic plate; and second line conductors disposed perpendicular to the respective ones of the first line conductors and disposed in respective edges of the dielectric substrate.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An antenna structure comprising:
   at least one feeder;
   a plurality of dielectric substrates;
   a plurality of conductive plates disposed between the plurality of dielectric substrates, the plurality of conductive plates including at least one opening; and
   a radiator electrically connected to the at least one feeder through conductive vias in the plurality of dielectric substrates and the plurality of conductive plates,
   wherein the radiator comprises:
      a plurality of first parasitic conductive plates spaced apart from each other, and
      a second parasitic conductive plate disposed between the plurality of first parasitic conductive plates, the second parasitic conductive plate being spaced apart from the plurality of first parasitic conductive plates.

2. The antenna structure of claim 1, wherein the radiator further comprises a plurality of first line conductors disposed to be in contact with a portion of one edge of the second parasitic conductive plate.

3. The antenna structure of claim 2, wherein the radiator further comprises a plurality of second line conductors disposed perpendicular to respective longitudinal directions of the first line conductors and disposed in respective edges of a dielectric substrate on which the second parasitic conductive plate is disposed so as to provide a narrow beam of the antenna structure in a first direction.

4. The antenna structure of claim 2,
   wherein the first line conductors are arranged such that one end of each of the first line conductors is in contact with an edge of the second parasitic conductive plate,
   wherein each of the first line conductors is disposed perpendicular to the edge of the second parasitic conductive plate, and
   wherein a distance between the first line conductors disposed on opposite sides of the second parasitic conductive plate is spaced apart from each other by a wavelength $\lambda$, distance.

5. The antenna structure of claim 3,
   wherein the plurality of second line conductors are disposed on opposite ends of the dielectric substrate with the second parasitic conductive plate interposed therebetween,
   wherein one edge of the second parasitic conductive plate is spaced apart from a second line conductor facing the one edge by a wavelength $\lambda$, distance, and
   wherein a length of the second parasitic conductive plate is $\lambda/2$.

6. The antenna structure of claim 1,
   wherein the plurality of first parasitic conductive plates and the second parasitic conductive plate are disposed on a flat face of one of the plurality of dielectric substrates to be spaced apart from each other, and
   wherein the plurality of first parasitic conductive plates or the second parasitic conductive plate comprises a rectangular shape.

7. The antenna structure of claim 6,
   wherein each edge of the second parasitic conductive plate is parallel to one edge of a dielectric substrate having a rectangular shape, and
   wherein at least one edge of the plurality of first parasitic conductive plates is disposed in a state of being rotated by a predetermined angle relative to at least one edge of the dielectric substrate to provide a resonance frequency at which circular polarization appears.

8. The antenna structure of claim 6,
wherein four first parasitic conductive plates are provided and arranged to have a 2*2 array, and
wherein a center of the second parasitic conductive plate is arranged on a same line as a center of the 2*2 array.

9. The antenna structure of claim 1,
wherein at least one of the plurality of dielectric substrates and at least one of the plurality of conductive plates form one layer in the antenna structure, and
wherein a first layer of the antenna structure comprises a first dielectric substrate, a first conductive plate stacked on the first dielectric substrate, and a plurality of first conductive vias extending to the first conductive plate through the first dielectric substrate.

10. The antenna structure of claim 9,
wherein the first conductive plate comprises a first coupling slot provided inside a rectangular array formed by the plurality of first conductive vias,
wherein a resonance frequency of an antenna is based on a length of the first coupling slot, and
wherein a matching characteristic of the antenna is based on a width of the first coupling slot.

11. The antenna structure of claim 10,
wherein a second layer of the antenna structure comprises a second dielectric substrate, a second conductive plate stacked on the second dielectric substrate, and a plurality of second conductive vias extending to the second conductive plate through the second dielectric substrate, and
wherein an array of the plurality of second conductive vias are different from an array of the plurality of first conductive vias.

12. The antenna structure of claim 11,
wherein the second conductive plate includes a second coupling slot provided inside a rectangular array formed by the plurality of second conductive vias, and
wherein a resonance frequency of the antenna is based on a length of the second coupling slot, and
wherein the matching characteristic of the antenna is further based on a width of the second coupling slot.

13. The antenna structure of claim 12,
wherein a third layer of the antenna structure comprises a third dielectric substrate, a third conductive plate stacked on the third dielectric substrate, and a plurality of third conductive vias extending to the third conductive plate through the third dielectric substrate, and
wherein an array of the plurality of third conductive vias are different from the array of the plurality of first conductive vias and the array of the plurality of second conductive vias.

14. The antenna structure of claim 13,
wherein the third conductive plate comprises a cavity provided inside a ring-shaped array formed by the plurality of third conductive vias, and
wherein the cavity is configured to induce a narrow band matching characteristic depending on a diameter of the cavity.

15. The antenna structure of claim 8, wherein an arrangement of the four first parasitic conductive plates and the second parasitic conductive plate are configured to transmit/receive a first signal having a first frequency ranging from 3 GHz to 10 GHz.

16. An antenna structure comprising:
at least one feeder;
a first layer connected to the at least one feeder, the first layer comprising a first conductive plate;
a second layer disposed on a front face of the first layer, the second layer comprising a second conductive plate;
a third layer disposed on a front face of the second layer, the third layer comprising a third conductive plate; and
a fourth layer disposed on a front face of the third layer, the fourth layer comprising a radiator electrically connected to the at least one feeder through conductive vias,
wherein the radiator comprises:
a plurality of first parasitic conductive plates spaced apart from each other, and
a second parasitic conductive plate disposed between the plurality of first parasitic conductive plates, the second parasitic conductive plate being spaced apart from the plurality of first parasitic conductive plates.

17. The antenna structure of claim 16,
wherein the fourth layer comprises a dielectric substrate on which the plurality of first parasitic conductive plates and the second parasitic conductive plate are disposed,
wherein edges of the second conductive plate are disposed to be parallel to respective edges of the dielectric substrate, and
wherein at least one edge of the plurality of first parasitic conductive plates is disposed in a state of being rotated by a predetermined angle relative to at least one edge of the dielectric substrate to provide a resonance frequency at which circular polarization appears.

18. The antenna structure of claim 16, wherein the radiator comprises:
a plurality of first line conductors, one end of each of the plurality of first line conductors being disposed to be in contact with a portion of edge of the second parasitic conductive plate, each of the first line conductors disposed perpendicular to the portion of edge of the second parasitic conductive plate and being spaced apart from each other, and
a plurality of second line conductors disposed perpendicular to respective longitudinal directions of the plurality of first line conductors, the plurality of second line conductors being disposed in respective edges of a dielectric substrate so as to provide a narrow beam of the antenna structure upwards.

19. The antenna structure of claim 18,
wherein the first conductive plate comprises an array of first conductive vias formed therethrough and a first coupling slot disposed adjacent to the array of first conductive vias,
wherein the second conductive plate comprises an array of second conductive vias formed therethrough and a second coupling slot disposed adjacent to the array of second conductive vias, and
wherein the third conductive plate comprises an array of third conductive vias formed therethrough and a cavity disposed inside the array of third conductive vias, the cavity having a ring shape.

20. An electronic device comprising:
a housing;
a printed circuit board disposed within the housing;
a processor mounted on the printed circuit board; and
an antenna structure disposed inside or outside of the housing, wherein the antenna structure comprises:
   a feeder,
   a dielectric substrate,
   an array of first parasitic conductive plates disposed on the dielectric substrate to be spaced apart from each other,
   a second parasitic conductive plate disposed in a center of the array of first parasitic conductive plates,
   first line conductors disposed to be in contact with the second parasitic plate, and
   second line conductors disposed perpendicular to the first line conductors, respectively, and the second line conductors are disposed in respective edges of the dielectric substrate.

* * * * *